(12) United States Patent
Wang et al.

(10) Patent No.: US 12,537,630 B2
(45) Date of Patent: Jan. 27, 2026

(54) METHODS FOR COMMUNICATIONS, TERMINAL DEVICE, NETWORK DEVICE AND COMPUTER READABLE MEDIA

(71) Applicant: NEC CORPORATION, Tokyo (JP)

(72) Inventors: Gang Wang, Beijing (CN); Lin Liang, Beijing (CN)

(73) Assignee: NEC CORPORATION, Tokyo (JP)

( * ) Notice: Subject to any disclaimer, the term of this patent is extended or adjusted under 35 U.S.C. 154(b) by 382 days.

(21) Appl. No.: 18/027,012

(22) PCT Filed: Sep. 22, 2020

(86) PCT No.: PCT/CN2020/116881
§ 371 (c)(1),
(2) Date: Mar. 17, 2023

(87) PCT Pub. No.: WO2022/061533
PCT Pub. Date: Mar. 31, 2022

(65) Prior Publication Data
US 2023/0370209 A1    Nov. 16, 2023

(51) Int. Cl.
*H04L 1/1829* (2023.01)
*H04L 5/14* (2006.01)
*H04W 72/1268* (2023.01)

(52) U.S. Cl.
CPC .............. *H04L 1/1854* (2013.01); *H04L 5/14* (2013.01); *H04W 72/1268* (2013.01)

(58) Field of Classification Search
None
See application file for complete search history.

(56) References Cited

U.S. PATENT DOCUMENTS

| | | | | |
|---|---|---|---|---|
| 2020/0228248 A1* | 7/2020 | Islam | | H04L 5/0055 |
| 2020/0374048 A1* | 11/2020 | Lei | | H04L 1/1896 |
| 2022/0399978 A1* | 12/2022 | Gao | | H04L 5/0055 |
| 2023/0299928 A1* | 9/2023 | Ling | | H04L 1/1854 |
| | | | | 370/329 |

FOREIGN PATENT DOCUMENTS

| CN | 108292974 A | 7/2018 |
|---|---|---|
| CN | 110034892 A | 7/2019 |
| CN | 111193578 A | 5/2020 |

(Continued)

OTHER PUBLICATIONS

JP Office Action for Japanese Patent Application No. 2023-518239, mailed on Apr. 2, 2024 with English Translation, 5 Pages.

(Continued)

*Primary Examiner* — Lonnie V Sweet
(74) *Attorney, Agent, or Firm* — Sughrue Mion, PLLC

(57) ABSTRACT

Embodiments of the present disclosure provide a solution for transmitting HARQ feedback. A method for communications comprises in accordance with a determination that a first resource for transmission of a first HARQ feedback for a first SPS downlink transmission is unavailable, determining, at a terminal device, a second resource subsequent to the first resource in time domain. The method further comprises transmitting to a network device the first HARQ feedback on the second resource.

2 Claims, 14 Drawing Sheets

(56) References Cited

FOREIGN PATENT DOCUMENTS

WO      2020/032490 A1     2/2020

OTHER PUBLICATIONS

Intel Corporation, "UCI enhancements for eURLLC", 3GPP TSG RAN WG1#98b R1-1910661, Oct. 8, 2019, 15 Pages.
Wilus Inc., "Discussion on HARQ-ACK enhancement for IIoT/URLLC", 3GPP TSG RAN WG1#102-e R1-2006887, Aug. 8, 2020, 4 Pages.
CATT, "Discussion on PUSCH resource collision and DL SPS enhancement", 3GPP TSG RAN WG1 Meeting #98bis, RI-1910347, Oct. 14-20, 2019. 7 Pages, sections 1-5.
Huawei et al., "UE feedback enhancements for HARQ-ACK", 3GPP TSG RAN WG1 Meeting #102-e RI-2005243, Aug. 17-28, 2020, 8 Pages, sections 1-3.
Written Opinion for PCT/CN2020/116881 dated Jun. 18, 2021.
International Search Report for PCT/CN2020/116881 dated Jun. 18, 2021.

* cited by examiner

420 ⤴

430 ⤴

435 ⤴

METHODS FOR COMMUNICATIONS, TERMINAL DEVICE, NETWORK DEVICE AND COMPUTER READABLE MEDIA

CROSS REFERENCE TO RELATED APPLICATIONS

This Application is a National Stage of International Application No. PCT/CN2020/116881 filed Sep. 22, 2020.

FIELD

Embodiments of the present disclosure generally relate to the field of communication, and in particular, to a solution for transmitting Hybrid Automatic Repeat Request (HARQ) feedback.

BACKGROUND

To improve transmission reliability, a HARQ mechanism has been widely used in communication systems. In HARQ, a receiver feeds back a positive acknowledgement (ACK) to a transmitter if data from the transmitter is detected correctly, and a negative acknowledgement (NACK) if the data is not correctly detected. Then, a transmitter performs a new transmission or a retransmission depending on whether an ACK or NACK is received from the receiver.

For a terminal device configured with one or more Semi-Persistent Scheduling (SPS) configurations with short periodicity, there may be no available uplink (UL) symbols for Physical Uplink Control Channel (PUCCH) transmission for HARQ feedback for SPS PDSCH in a given Time Division Duplexing (TDD) configuration. It will degrade the SPS PDSCH transmission performance. Without corresponding HARQ feedback, SPS Physical downlink shared channel (PDSCH) would be always retransmitted, which would be inefficient.

SUMMARY

In general, example embodiments of the present disclosure provide a solution for transmitting HARQ feedback.

In a first aspect, there is provided a method for communications. The method comprises in accordance with a determination that a first resource for transmission of a first Hybrid Automatic Repeat Request, HARQ, feedback for a first Semi-persistent Scheduling, SPS, downlink transmission is unavailable, determining, at a terminal device, a second resource subsequent to the first resource in time domain. The method further comprises transmitting to a network device the first HARQ feedback on the second resource.

In a second aspect, there is provided a method for communications. The method comprises in accordance with a determination that a resource for transmission of at least one Hybrid Automatic Repeat Request, HARQ, feedback for at least one Semi-persistent Scheduling, SPS, downlink transmission is unavailable, receiving at a terminal device from a network device a request for a HARQ Acknowledge, HARQ-ACK, codebook. The method further comprises transmitting to the network device the HARQ-ACK codebook that includes the at least one HARQ feedback.

In a third aspect, there is provided a method for communications. The method comprises transmitting from a network device to a terminal device a first Semi-persistent Scheduling, SPS, downlink transmission. The method further comprises in response to a failure of reception of a first Hybrid Automatic Repeat Request, HARQ, feedback for the first SPS downlink transmission on a first resource, receiving from the terminal device the first HARQ feedback on a second resource. The second resource is subsequent to the first resource in time domain.

In a fourth aspect, there is provided a method for communications. The method comprises in response to failure of reception of at least one Hybrid Automatic Repeat Request, HARQ, feedback for at least one Semi-persistent Scheduling, SPS, downlink transmission, transmitting from a network device to a terminal device a request or a HARQ Acknowledge, HARQ-ACK, codebook. The method further comprises receiving from the terminal device the HARQ-ACK codebook that comprises the at least one HARQ feedback.

In a fifth aspect, there is provided a terminal device. The terminal device comprises a processor and a memory storing instructions. The memory and the instructions are configured, with the processor, to cause the terminal device to perform the method according to the first aspect.

In a sixth aspect, there is provided a terminal device. The terminal device comprises a processor and a memory storing instructions. The memory and the instructions are configured, with the processor, to cause the terminal device to perform the method according to the second aspect.

In a seventh aspect, there is provided a network device. The network device comprises a processor and a memory storing instructions. The memory and the instructions are configured, with the processor, to cause the network device to perform the method according to the first aspect.

In an eighth aspect, there is provided a network device. The network device comprises a processor and a memory storing instructions. The memory and the instructions are configured, with the processor, to cause the network device to perform the method according to the second aspect.

In a ninth aspect, there is provided a computer readable medium having instructions stored thereon. The instructions, when executed on at least one processor of a device, cause the device to perform the method according to the first aspect.

In a tenth aspect, there is provided a computer readable medium having instructions stored thereon. The instructions, when executed on at least one processor of a device, cause the device to perform the method according to the second aspect.

In an eleventh aspect, there is provided a computer readable medium having instructions stored thereon. The instructions, when executed on at least one processor of a device, cause the device to perform the method according to the third aspect.

In a twelfth aspect, there is provided a computer readable medium having instructions stored thereon. The instructions, when executed on at least one processor of a device, cause the device to perform the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
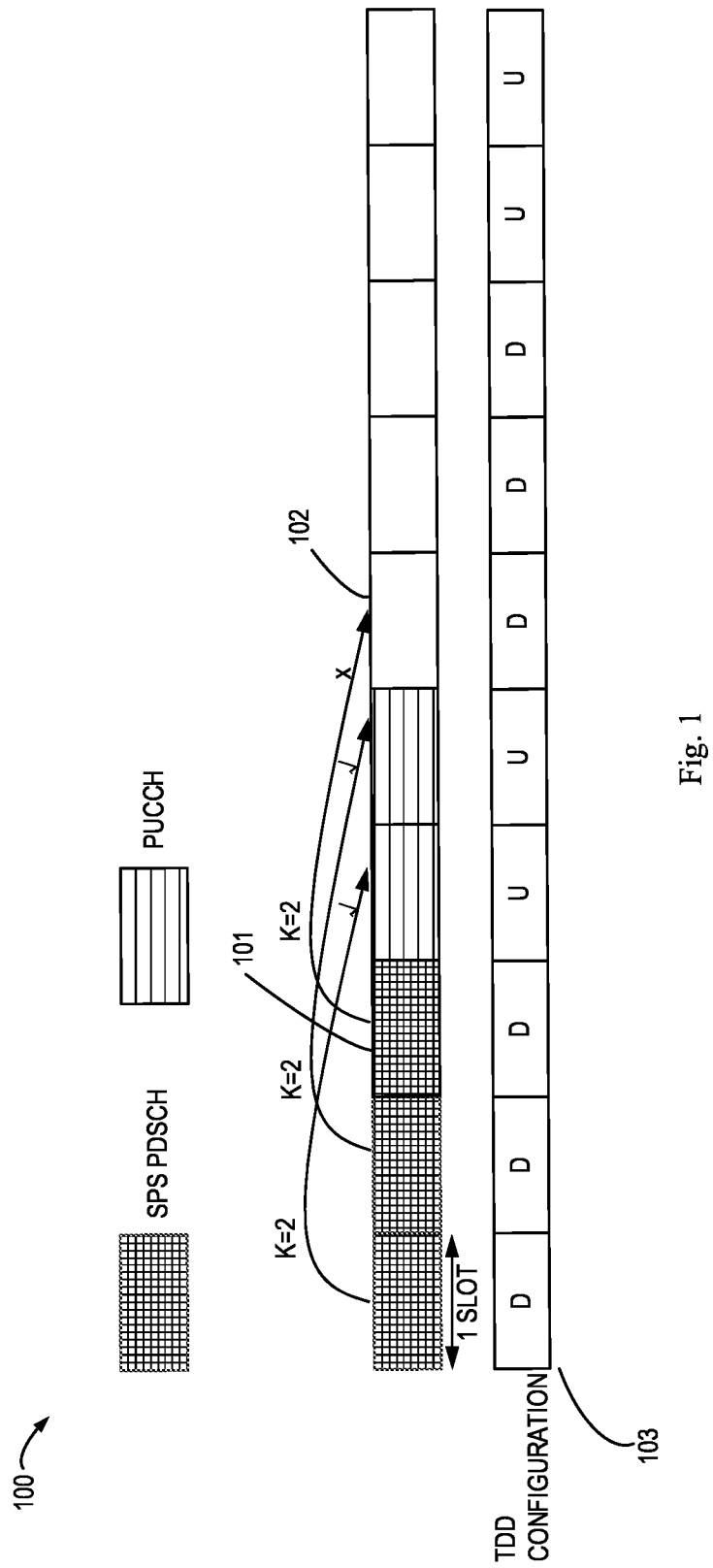
FIG. 1 is a schematic diagram of a communication network in which some embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X communication, a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), vehicle-mounted terminal devices, devices of pedestrians, roadside units, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, some embodiments will be described with reference to UEs as examples of terminal devices and the terms "terminal device" and "user equipment" (UE) may be used interchangeably in the context of the present disclosure.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 illustrates an example 100 in which a HARQ feedback for SPS downlink transmission is cancelled due to absence of a resource for transmission in accordance with a conventional solution.

In the example 100, a terminal device is configured with an SPS configuration with one slot periodicity, slot based HARQ feedback, and a HARQ timing value K of 2 in an activation Downlink Control Information (DCI).

As shown in FIG. 1, in a slot 101, a network device transmits an SPS transmission on PDSCH to the terminal device. Hereinafter, the SPS transmission on PDSCH is also referred to as SPS PDSCH. Based on the HARQ timing value K, the terminal device determines that a HARQ feedback for the SPS PDSCH in the slot 101 is to be transmitted in a slot 102. However, based on a TDD configuration 103, the terminal device determines that the slot 102 is configured for downlink transmission. Thus, the terminal device determines that the slot 102 is unavailable for transmission of the HARQ feedback for the SPS PDSCH in the slot 101. In this case, the terminal device may cancel the transmission of the HARQ feedback. Without the HARQ feedback, the SPS PDSCH would be always retransmitted, which would be inefficient.

In order to solve the above technical problem in conventional solutions, in a first aspect, embodiments of the present disclosure provide a solution for transmitting HARQ feedback. In this solution, if a terminal device determines that a first resource is unavailable for transmission of a HARQ feedback for an SPS downlink transmission, the terminal device defers the transmission of the HARQ feedback until the next available resource. In this way, the cancelled HARQ feedback may be retransmitted to a network device. Thus, retransmission of the SPS downlink transmission may be reduced.

In a second aspect, embodiments of the present disclosure provide a solution for transmitting HARQ feedback. In this solution, a network device transmits to the terminal device a request for the retransmission for a group of HARQ feedbacks for SPS downlink transmissions. Upon receiving the request, the terminal device transmits to the network device a HARQ-ACK codebook that comprises the group of HARQ feedbacks. In this way, the cancelled HARQ feedback may be retransmitted to a network device. Thus, retransmission of the SPS downlink transmission may be reduced.

Embodiments of the present disclosure may be applied to any suitable scenarios. For example, embodiments of the present disclosure may be implemented at URLLC (Ultra-reliable and Low Latency Communication). Alternatively, embodiments of the present disclosure can be implemented in one of the followings: reduced capability NR devices, NR multiple-input and multiple-output (MIMO), NR sidelink enhancements, NR systems with frequency above 52.6 GHz, an extending NR operation up to 71 GHz, narrow band-Internet of Thing (NB-IOT)/enhanced Machine Type Communication (eMTC) over non-terrestrial networks (NTN), NTN, UE power saving enhancements, NR coverage enhancement, NB-IoT and LTE-MTC, Integrated Access and Backhaul (IAB), NR Multicast and Broadcast Services, or enhancements on Multi-Radio Dual-Connectivity.

Figure 2:
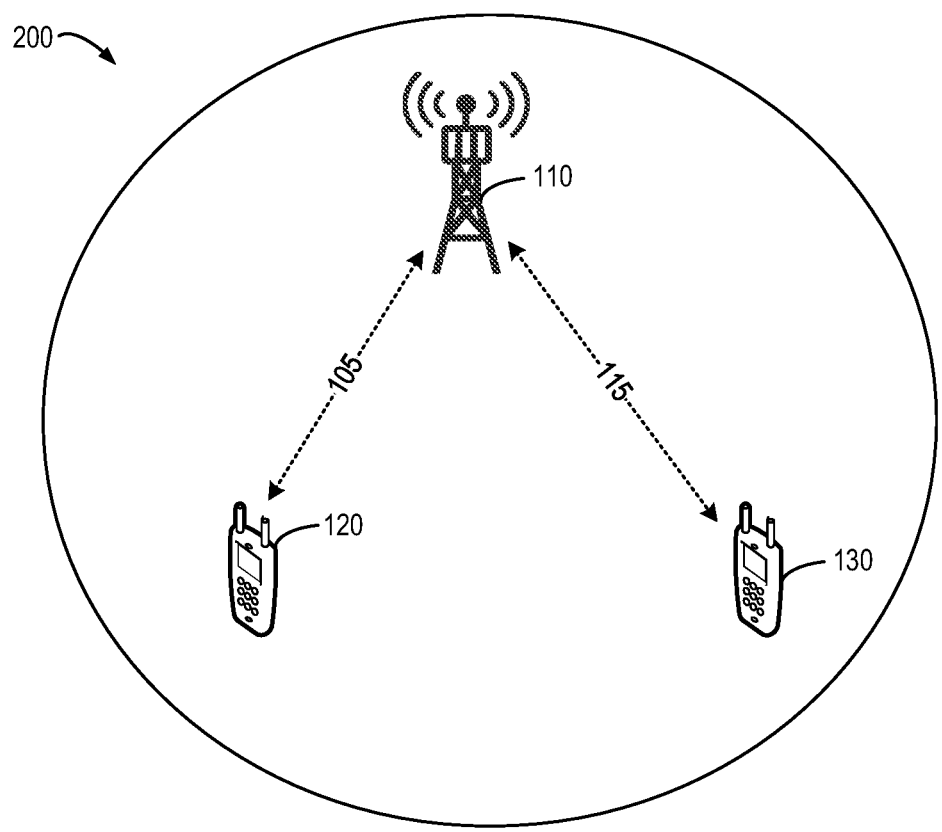
FIG. 2 illustrates an example in which a HARQ feedback for SPS downlink transmission is cancelled due to absence of a resource for transmission in accordance with a conventional solution.

FIG. 2 is a schematic diagram of a communication environment 200 in which some embodiments of the present disclosure can be implemented. As shown in FIG. 2, the communication environment 200, which may also be referred to as a communication network 200, includes a network device 110 serving a terminal device 120 and a terminal device 130. In particular, the terminal device 120 may communicate with the network device 110 via a communication channel 105, and the terminal device 130 may communicate with the network device 110 via a communication channel 115.

For transmissions from the network device 110 to the terminal device 120 or the terminal device 130, the communication channel 105 or 115 may be referred to as a downlink channel. For transmissions from the terminal device 120 or the terminal device 130 to the network device 110, the communication channel 105 or 115 may be referred to as an uplink channel.

Although the network device 110, the terminal device 120 and the terminal device 130 are described in the communication environment 200 of FIG. 2, embodiments of the present disclosure may be equally applicable to any other suitable communication devices in communication with one another. That is, embodiments of the present disclosure are not limited to the example scenario of FIG. 2. In this regard, it is noted that although the terminal devices 120 and 130 are schematically depicted as mobile phones in FIG. 2, it is understood that this depiction is only for example without suggesting any limitation. In other embodiments, the terminal devices 120 and 130 may be any other wireless communication devices, for example, vehicle-mounted terminal devices.

It is to be understood that the number of the terminal devices and the number of the network devices as shown in FIG. 2 are only for the purpose of illustration without suggesting any limitations. The communication environment 200 may include any suitable number of terminal devices, any suitable number of network devices, and any suitable number of other communication devices adapted for implementing embodiments of the present disclosure. In addition, it would be appreciated that there may be various wireless communications as well as wireline communications (if needed) among all the communication devices.

The communications in the communication environment 200 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 3:
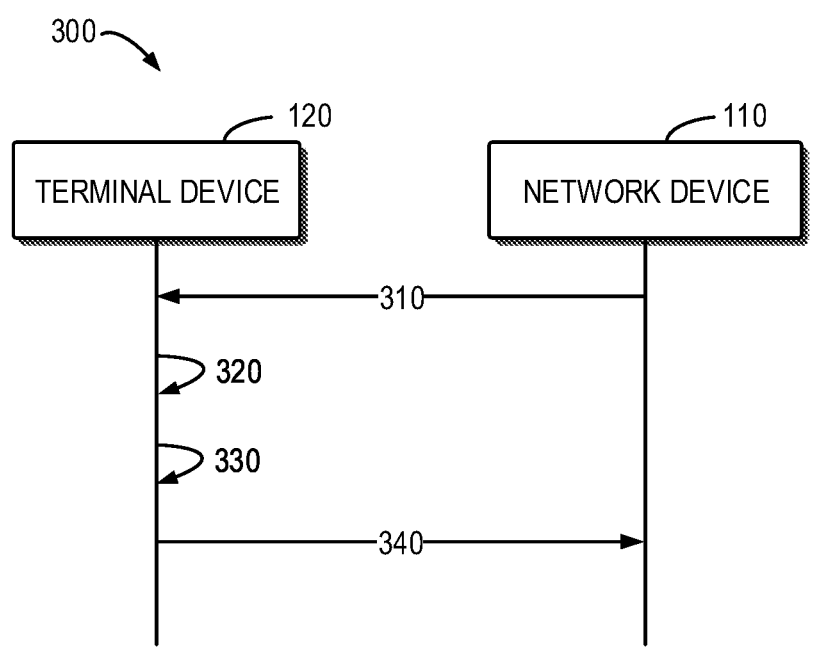
FIG. 3 illustrates an example signaling chart showing an example process for transmitting HARQ feedback in accordance with some embodiments of the present disclosure.

Principle and implementations of the present disclosure will be described in detail below with reference to FIGS. 3 to 11. FIG. 3 illustrates an example signaling chart showing an example process 300 for transmitting HARQ feedback in accordance with some embodiments of the present disclosure. For the purpose of discussion, the communication process 300 will be described with reference to FIG. 2. However, it would be appreciated that the communication process 300 may be equally applicable to other communication scenarios where a network device and a terminal device communicate with each other.

As shown in FIG. 3, the network device 110 transmits (310) a first SPS downlink transmission to the terminal device 120. The terminal device 120 determines (320) whether a first resource for transmission of a first HARQ feedback for the first SPS downlink transmission is available or unavailable. If it is determined that the first resource is unavailable, the terminal device 120 determines (330) a second resource subsequent to the first resource in time domain. In turn, the terminal device 120 transmits (340) the first HARQ feedback to the network device on the second resource.

In accordance with the present disclosure, the terminal device defers the transmission of the HARQ feedback until the second resource subsequent to the first resource. In this way, the HARQ feedback may be transmitted to the network device. Thus, retransmission of the SPS downlink transmission may be reduced.

In some example embodiments, the second resource is the earliest available resource among resources configured for transmission of a second HARQ feedback for a second SPS downlink transmission different from the first SPS downlink transmission. Hereinafter, the earliest available resource is also referred to as an available resource that is the nearest to the first resource. This will be described with reference to FIG. 4A.

Figure 4A:
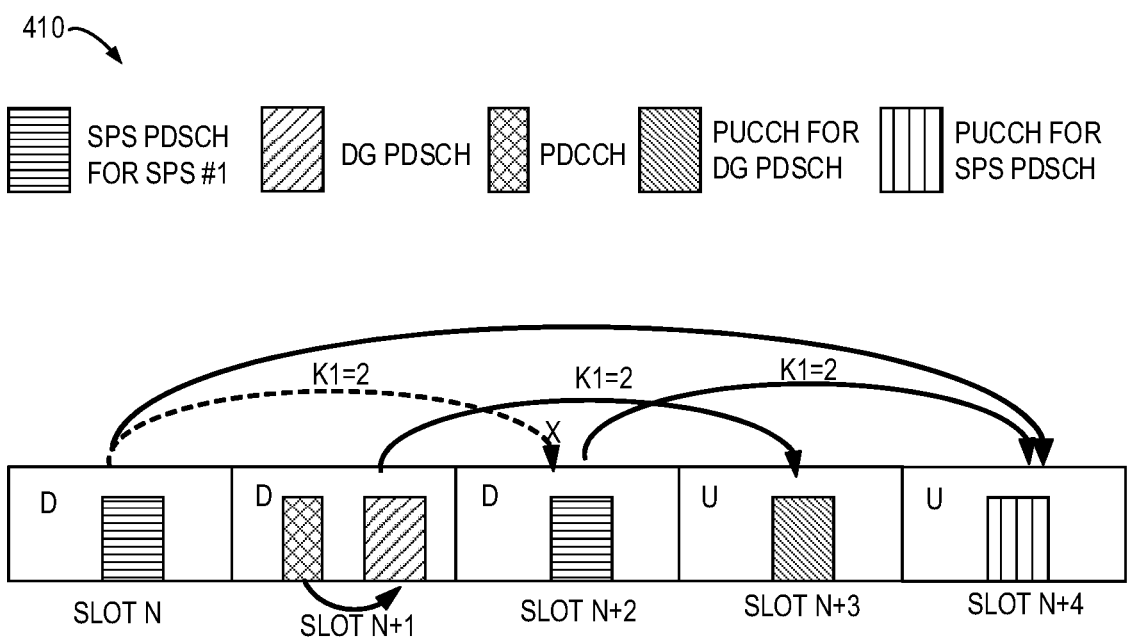
FIGS. 4A-4J illustrate simplified block diagrams of example processes for transmitting HARQ feedback in accordance with some embodiments of the present disclosure, respectively.

FIG. 4A illustrates an example 410 in which the first HARQ feedback is transmitted on the second resource configured for transmission of the second HARQ feedback for the second SPS downlink transmission in accordance with some embodiments of the present disclosure. For the purpose of discussion, the example 410 will be described with reference to FIG. 2. However, it would be appreciated that the example 410 may be equally applicable to other communication scenarios where a network device and a terminal device communicate with each other.

In the example 410, the terminal device 120 is configured with an SPS configuration #1. A HARQ timing value K1 for the SPS configuration #1 is indicated as 2. The network device 110 transmits SPS PDSCH in slots n and n+2 and dynamic downlink transmission in a slot n+1. Hereinafter, the dynamic transmission on PDSCH is also referred to as DG PDSCH. A PUCCH resource in a slot n+3 is configured for transmission of a HARQ feedback for DG PDSCH. A PUCCH resource in a slot n+4 is configured for transmission of a HARQ feedback for SPS PDSCH.

Based on the HARQ timing value K1 for the SPS configuration #1, the terminal device 120 determines that a HARQ feedback for the SPS PDSCH in a slot n is to be transmitted in a slot n+2. However, based on a TDD configuration (not shown), the terminal device 120 determines that the slot n+2 is configured for downlink transmission. Thus, the terminal device 120 determines that the slot n+2 is unavailable for transmission of the HARQ feedback for the SPS PDSCH in the slot n. In this case, the terminal device 120 postpones the transmission of the HARQ feedback.

Based on the HARQ timing value K1 for the SPS PDSCH, the terminal device 120 determines that a HARQ feedback for the SPS PDSCH in a slot n+2 is to be transmitted in a slot n+4.

The terminal device 120 multiplexes the postponed HARQ feedback for the SPS PDSCH in the slot n with the HARQ feedback for the SPS PDSCH in the slot n+2. In turn, the terminal device 120 transmits the multiplexed HARQ feedbacks to the network device 110 in the slot n+4.

Table 1 shows pseudo codes for the example 410.

TABLE 1

The first SPS PDSCH indicated by active DCI is received on slot n1, k1 is HARQ timing indicated in DCI or configured by RRC.
When SPS PDSCH is received on slot n
   if slot n+k1 is DL slot or flexible symbols not available for PUCCH transmission,
     find the minimum integer m > 0 such that slot n+k1+m has PUCCH resource for HARQ-ACK feedback for SPS PDSCH, where the HARQ-ACK has same priority with priority with HARQ-ACK for SPS PDSCH on slot n;
     k1'=k1+m;
     set the HARQ timing for SPS PDSCH on slot n to k1';
   end if
     multiplex delayed HARQ-ACK for SPS PDSCH on slot n in PUCCH on slot n+k1'
End while In some example embodiments, the first HARQ feedback has the same priority as the second HARQ feedback.

In some example embodiments, if a third resource for transmission of a third HARQ feedback for a third SPS downlink transmission is unavailable, the terminal device 120 may generate a first HARQ-ACK codebook by multiplexing the first HARQ feedback and the third HARQ feedback with the second HARQ feedback. The third resource is prior to the second resource in time domain. In turn, the terminal device 120 transmits the first HARQ-ACK codebook on the second resource.

In some example embodiments, in order to generate the first HARQ-ACK codebook, the terminal device 120 may bundle the first HARQ feedback and the third HARQ feedback as one bit. In turn, the terminal device 120 generates the first HARQ-ACK codebook by multiplexing the one bit with the second HARQ feedback, which will be described with reference to FIG. 4B.

Figure 4B:
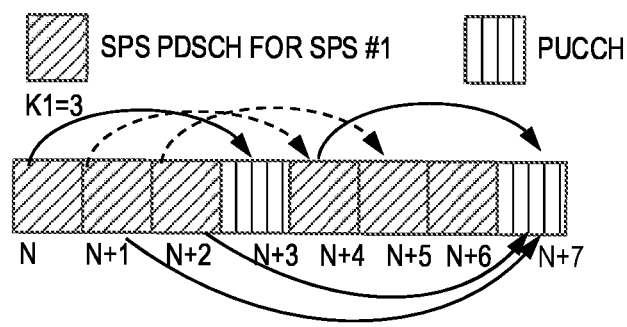

FIG. 4B illustrates an example 420 in which the postponed HARQ feedbacks are bundled as one bit for transmission in accordance with some embodiments of the present disclosure. For the purpose of discussion, the example 420 will be described with reference to FIG. 2. However, it would be appreciated that the example 420 may be equally applicable to other communication scenarios where a network device and a terminal device communicate with each other.

In the example 420, the terminal device 120 is configured with an SPS configuration #1 with one-slot periodicity. A HARQ timing value K1 for the SPS configuration #1 is indicated as 3. The network device 110 transmits SPS PDSCH in slots n, n+1, n+2, n+4, n+5, and n+6 for the SPS configuration #1. PUCCH resources in slots n+3 and n+7 are configured for transmission of HARQ feedbacks for SPS downlink transmission.

Based on the HARQ timing value K1 for the SPS configuration #1, the terminal device 120 determines that a HARQ feedback for the SPS PDSCH in a slot n+1 is to be transmitted in a slot n+4 and a HARQ feedback for the SPS PDSCH in a slot n+2 is to be transmitted in a slot n+5. However, based on a TDD configuration (not shown), the terminal device 120 determines that the slots n+4 and n+5 are configured for downlink transmission. Thus, the terminal device 120 determines that the slots n+4 and n+5 are unavailable for transmissions of the HARQ feedbacks for the SPS PDSCHs in the slots n+1 and n+2. In this case, the terminal device 120 postpones the transmissions of the HARQ feedbacks.

Based on the HARQ timing value K1 for the SPS configuration #1, the terminal device 120 determines that a HARQ feedback for the SPS PDSCH in a slot n+4 is to be transmitted in a slot n+7.

Figure 4C:
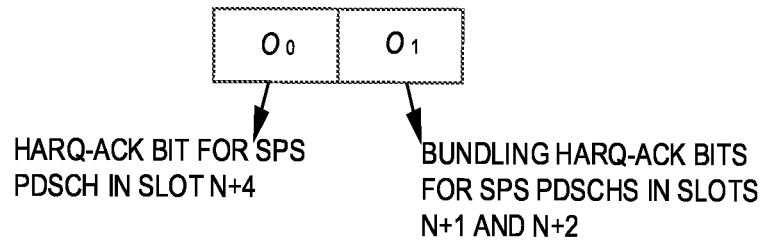

In order to reduce overhead, the terminal device 120 may bundle the HARQ feedbacks for the SPS PDSCHs in the slots n+1 and n+2 as one bit, as shown in FIG. 4C. In turn, the terminal device 120 generates a HARQ-ACK codebook 430 by multiplexing the one bit with the HARQ feedback for the SPS PDSCH in the slot n+4.

Figure 4D:
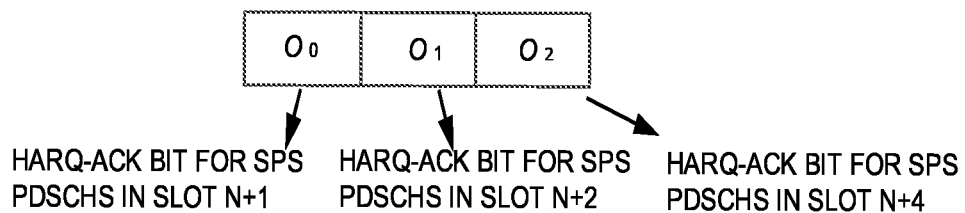

Alternatively, the terminal device 120 may not bundle the HARQ feedbacks for the SPS PDSCHs in the slots n+1 and n+2 as one bit, as shown in FIG. 4D. As shown in FIG. 4D, the terminal device 120 generates a HARQ-ACK codebook 435 by arranging the HARQ feedbacks for the SPS PDSCHs in the slots n+1 and n+2 before the HARQ feedback for the SPS PDSCH in the slot n+4. Of course, the terminal device 120 may generate the HARQ-ACK codebook 435 by arranging the HARQ feedbacks for the SPS PDSCHs in the slots n+1 and n+2 after the HARQ feedback for the SPS PDSCH in the slot n+4.

In such example embodiments, a size of the HARQ-ACK codebook is equal to the total number of postponed HARQ-ACK bit(s) and original HARQ-ACK bits indicated in the slot.

In such example embodiments, the HARQ-ACK bits may be arranged in an order of at least one of the following: indexes of DL slots in which the first, second and third SPS downlink transmissions are received, indexes of SPS configurations for the first, second and third SPS downlink transmissions, or indexes of component carriers (CC) configured for the first, second and third SPS downlink transmissions. For example, for a single SPS configuration and non-Carrier-Aggregation (CA) case, the HARQ-ACK bits may be arranged in an ascending order of indexes of DL slots for SPS PDSCH receptions. For multiple SPS configurations and non-CA case, the HARQ-ACK bits may be arranged in an ascending order of indexes of DL slots for SPS PDSCH receptions per SPS configuration index, and then in an ascending order of SPS configuration index. For multiple SPS configurations and CA case, the HARQ-ACK bits may be arranged in an ascending order of DL slot per {SPS configuration index, serving cell index}, and then in an ascending order of SPS configuration index per {serving cell index}, and then in an ascending order of serving cell index.

In some example embodiments, the first HARQ feedback has different priority from the second HARQ feedback, which will be described with reference to FIG. 4E.

Figure 4E:
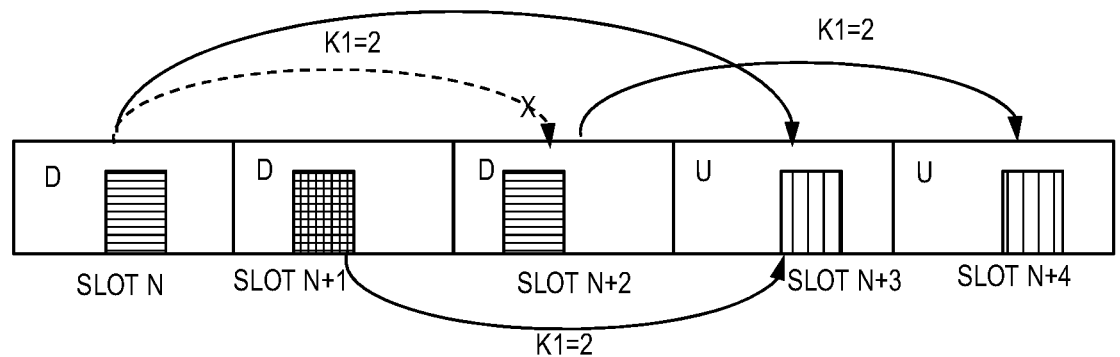

FIG. 4E illustrates an example 440 in which the first HARQ feedback is transmitted on the second resource configured for transmission of the second HARQ feedback for the second SPS downlink transmission in accordance with some embodiments of the present disclosure. For the purpose of discussion, the example 440 will be described with reference to FIG. 2. However, it would be appreciated that the example 440 may be equally applicable to other communication scenarios where a network device and a terminal device communicate with each other.

In the example 440, the terminal device 120 is configured with an SPS configuration #1 and an SPS configuration #2. A HARQ timing value K1 for the SPS configuration #1 is indicated as 2. A HARQ timing value K1 for the SPS configuration #2 is indicated as 2. The network device 110 transmits SPS PDSCH in slots n and n+2 for the SPS configuration #1 and SPS PDSCH in a slot n+1 for the SPS configuration #2. PUCCH resources in slots n+3 and n+4 are configured for transmission of HARQ feedbacks for SPS downlink transmission. HARQ feedbacks for SPS PDSCH in a slot n and SPS PDSCH in a slot n+2 have a high priority. The HARQ feedback for SPS PDSCH in a slot n+1 has a low priority.

Based on the HARQ timing value K1 for the SPS configuration #1, the terminal device 120 determines that a HARQ feedback for the SPS PDSCH in a slot n is to be transmitted in a slot n+2. However, based on a TDD configuration (not shown), the terminal device 120 determines that the slot n+2 is configured for downlink transmission. Thus, the terminal device 120 determines that the slot n+2 is unavailable for transmission of the HARQ feedback for the SPS PDSCH in the slot n. In this case, the terminal device 120 postpones the transmission of the HARQ feedback.

Based on the HARQ timing value K1 for the SPS configuration #2, the terminal device 120 determines that a HARQ feedback for the SPS PDSCH in a slot n+1 is to be transmitted in a slot n+3.

The terminal device 120 multiplexes the postponed HARQ feedback for the SPS PDSCH in the slot n with the HARQ feedback for the SPS PDSCH in the slot n+1. In turn, the terminal device 120 transmits the multiplexed HARQ feedbacks to the network device 110 in the slot n+3.

In the example 440, the postponed HARQ feedback for SPS PDSCH having the high priority is multiplexed with the HARQ feedback for SPS PDSCH having the low priority and transmitted to the network device 110. Thus, delay for transmission of the postponed HARQ feedback is reduced.

In some example embodiments, the second resource is configured for transmission of a HARQ feedback for a dynamic downlink transmission, which will be described with reference to FIG. 4F.

Figure 4F:
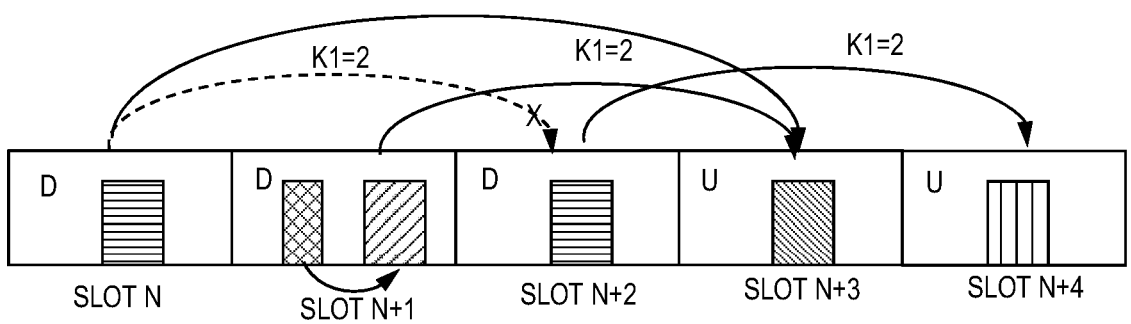

FIG. 4F illustrates an example 450 in which the first HARQ feedback is transmitted on the second resource configured for transmission of a HARQ feedback for a dynamic downlink transmission in accordance with some embodiments of the present disclosure. Hereinafter, the HARQ feedback for a dynamic downlink transmission is also referred to as the dynamic HARQ feedback. For the purpose of discussion, the example 450 will be described with reference to FIG. 2. However, it would be appreciated that the example 450 may be equally applicable to other communication scenarios where a network device and a terminal device communicate with each other.

In the example 450, the terminal device 120 is configured with an SPS configuration #1. A HARQ timing value K1 for the SPS configuration #1 is indicated as 2. The network device 110 transmits SPS PDSCH in slots n and n+2 and dynamic downlink transmission in a slot n+1. Hereinafter, the dynamic transmission on PDSCH is also referred to as DG PDSCH. A PUCCH resource in a slot n+3 is configured for transmission of a HARQ feedback for DG PDSCH. A PUCCH resource in a slot n+4 is configured for transmission of a HARQ feedback for SPS PDSCH.

Based on the HARQ timing value K1 for the SPS configuration #1, the terminal device 120 determines that a HARQ feedback for the SPS PDSCH in a slot n is to be transmitted in a slot n+2. However, based on a TDD configuration (not shown), the terminal device 120 determines that the slot n+2 is configured for downlink transmission. Thus, the terminal device 120 determines that the slot n+2 is unavailable for transmission of the HARQ feedback for the SPS PDSCH in the slot n. In this case, the terminal device 120 postpones the transmission of the HARQ feedback.

Based on the HARQ timing value K1 for the DG PDSCH, the terminal device 120 determines that a HARQ feedback for the DG PDSCH in a slot n+1 is to be transmitted in a slot n+3.

The terminal device 120 multiplexes the postponed HARQ feedback for the SPS PDSCH in the slot n with the HARQ feedback for the DG PDSCH in the slot n+1 to generate a HARQ-ACK codebook. In turn, the terminal device 120 transmits to the network device 110 the HARQ-ACK codebook comprising the multiplexed HARQ feedbacks in the slot n+3. Hereinafter, the HARQ-ACK codebook comprising the postponed HARQ feedback for the SPS PDSCH and the HARQ feedback for the DG PDSCH may be Type-1 HARQ-ACK codebook.

In the example 450, the postponed HARQ feedback for SPS PDSCH is multiplexed with the HARQ feedback for DG PDSCH and transmitted to the network device 110. Thus, delay for transmission of the postponed HARQ feedback is reduced.

Table 2 shows pseudo codes for the example 450.

TABLE 2

The first SPS PDSCH indicated by active DCI is received on slot n1, k1 is HARQ timing indicated in DCI or configured by RRC.
When SPS PDSCH is received on slot n
    if slot n+k1 is DL slot or flexible symbols not available for PUCCH transmission,
        find the minimum integer m > 0 such that slot n+k1+m has PUCCH resource
for HARQ-ACK feedback, where the HARQ-ACK has same priority with priority with
HARQ-ACK for SPS PDSCH on slot n; //example 450➔ different priority
        k1'=k1+m;
        set the HARQ timing for SPS PDSCH on slot n to k1';
    end if
        multiplex postponed HARQ-ACK for SPS PDSCH on slot n in PUCCH on
slot n+k1'
End while

---

It will be understood that in the example 450, the terminal device 120 multiplexes one postponed HARQ feedback for the SPS PDSCH in the slot n with the HARQ feedback for the DG PDSCH in the slot n+1. In other examples, the terminal device 120 may multiplex multiple postponed HARQ feedbacks for the SPS PDSCHs with the HARQ feedback for the DG PDSCH in the slot n+1. In such examples, the terminal device 120 may bundle the multiple postponed HARQ feedbacks as one bit and append the one bit in the end of the codebook. Alternatively, the terminal device 120 may not bundle the multiple postponed HARQ feedbacks. Instead, the terminal device 120 may multiplex the multiple postponed HARQ feedbacks as a sub-codebook and append the sub-codebook in the end of the codebook.

In some example embodiments, in order to generate the Type-1 HARQ-ACK codebook, the terminal device 120 may determine a position in the Type-1 HARQ-ACK codebook based on a set of HARQ timing values for the DG PDSCH. In turn, the terminal device 120 may arrange the postponed HARQ feedback in the determined position, which will be described with reference to FIG. 4G.

Figure 4G:
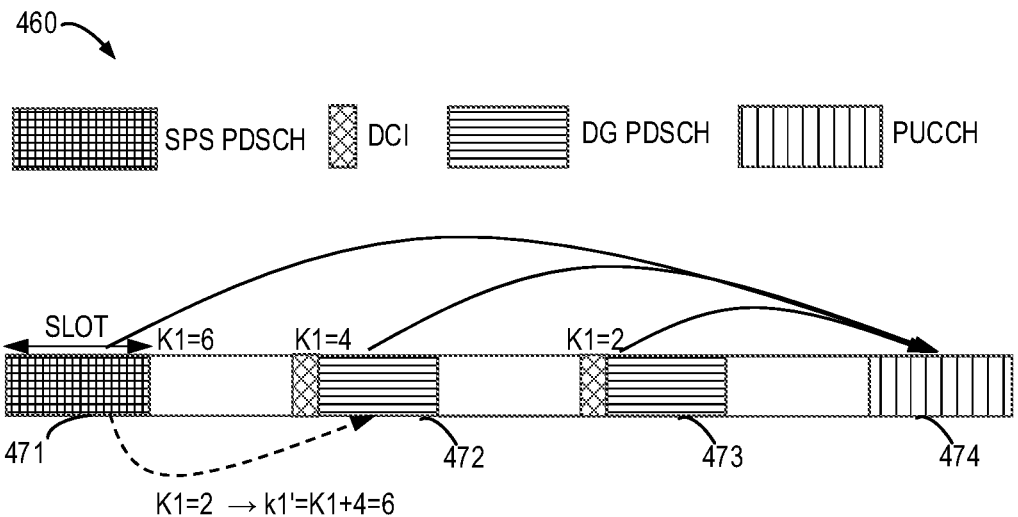

FIG. 4G illustrates an example 460 in which the postponed HARQ feedback is arranged in an invalid position Type-1 HARQ-ACK codebook in accordance with some embodiments of the present disclosure. For the purpose of discussion, the example 460 will be described with reference to FIG. 2. However, it would be appreciated that the example 460 may be equally applicable to other communication scenarios where a network device and a terminal device communicate with each other.

In the example 460, the indicated HARQ timing value for SPS PDSCH is K1, the actual HARQ timing value from SPS PDSCH to the available PUCCH resource is K1'. K1 set for DG PDSCH is {6,4,2}. Thus, K1' is also in the K1 set.

Conventionally, if a terminal device is configured with pdsch-HARQ-ACK-Codebook=semi-static, Type-1 HARQ-ACK codebook may be determined as below. The terminal device reports HARQ-ACK information for a corresponding PDSCH reception or SPS PDSCH release only in a HARQ-ACK codebook that the terminal device transmits in a slot indicated by a value of a PDSCH-to-HARQ_feedback timing indicator field in a corresponding DCI format 1_0 or DCI format 1_1. The terminal device reports NACK value(s) for HARQ-ACK information bit(s) in a HARQ-ACK codebook that the terminal device transmits in a slot not indicated by a value of a PDSCH-to-HARQ_feedback timing indicator field in a corresponding DCI format 1_0 or DCI format 1_1.

For example, Table 3 shown a conventional Type-1 HARQ-ACK codebook for K1 set={6,4,2}.

TABLE 3

| HARQ-ACK position for K1 = 6 | HARQ-ACK position for K1 = 4 | HARQ-ACK position for K1 = 2 |
| --- | --- | --- |
| NACK | ACK/NACK for DG PDSCH in a slot 472 | ACK/NACK for DG PDSCH in a slot 473 |

As shown in Table 3, though there is a HARQ-ACK position for K1=6 in the conventional Type-1 HARQ-ACK codebook, the terminal device still reports NACK in the HARQ-ACK position because the HARQ-ACK timing value K1 for SPS PDSCH is 2. In this case, the HARQ-ACK position for K1=6 is referred to as an invalid HARQ-ACK position.

In accordance with some embodiments of the present disclosure, if the actual HARQ-ACK timing value K1'=K1+m for the postponed HARQ feedback for SPS PDSCH is in the K1 set, the terminal device 120 may report the postponed HARQ feedback in the invalid HARQ-ACK position in a slot 474. Table 4 shown a Type-1 HARQ-ACK codebook for K1 set={6,4,2} in accordance with some embodiments of the present disclosure.

TABLE 4

| HARQ-ACK position for K1 = 6 | HARQ-ACK position for K1 = 4 | HARQ-ACK position for K1 = 2 |
| --- | --- | --- |
| the postponed HARQ feedback for SPS PDSCH in a slot 471 | ACK/NACK for DG PDSCH in a slot 472 | ACK/NACK for DG PDSCH in a slot 473 |

In some example embodiments, the HARQ-ACK codebook comprising the postponed HARQ feedback for the SPS PDSCH and the HARQ feedback for the DG PDSCH may be Type-2 HARQ-ACK codebook. In such example embodiments, the terminal device 120 may bundle the multiple postponed HARQ feedbacks as one bit and append the one bit in the end of the Type-2 HARQ-ACK codebook. Alternatively, the terminal device 120 may not bundle the multiple postponed HARQ feedbacks. Instead, the terminal device 120 may multiplex the multiple postponed HARQ feedbacks as a sub-codebook and append the sub-codebook in the end of the Type-2 HARQ-ACK codebook.

In some example embodiments, in order to transmit the postponed HARQ feedback for SPS PDSCH, the terminal device 120 may determine an uplink slot based on a TDD configuration. In turn, the terminal device 120 may select a PUCCH resource as the second resource from the uplink slot based on an identifier of the PUCCH resource (n1PUCCH-AN) or a starting entry in a list of PUCCH resources for downlink SPS HARQ acknowledge (SPS-PUCCH-AN-List). Then, the terminal device 120 may transmit the postponed HARQ feedback on the selected PUCCH resource, which will be described with reference to FIG. 4H.

Figure 4H:
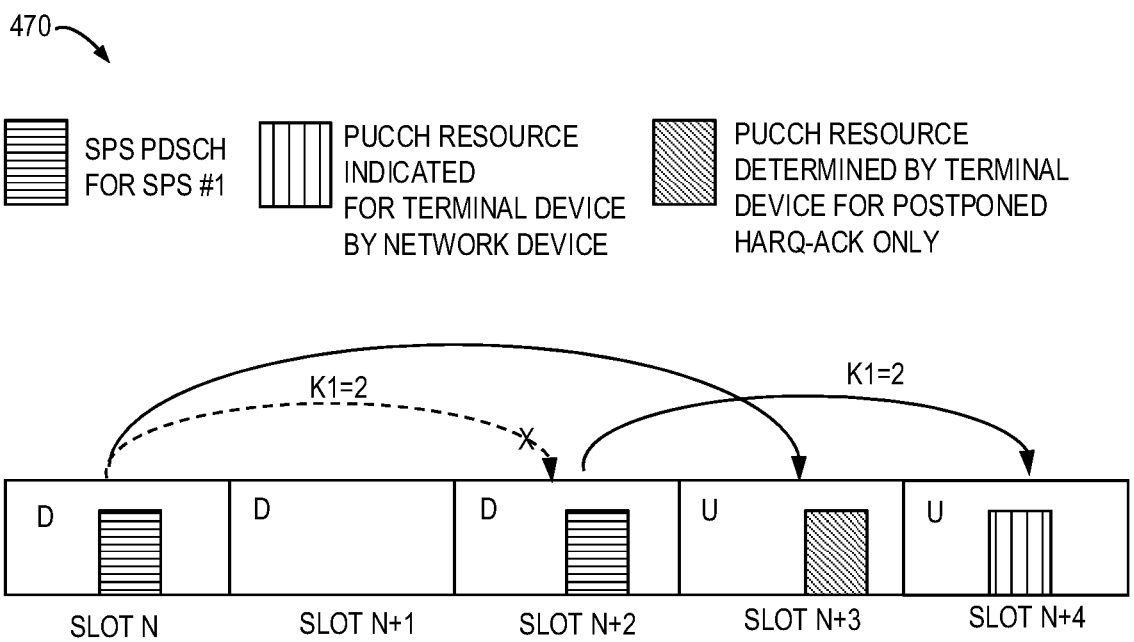

FIG. 4H illustrates an example 470 in which the postponed HARQ feedback is transmitted on the selected PUCCH resource in accordance with some embodiments of the present disclosure. For the purpose of discussion, the example 470 will be described with reference to FIG. 2. However, it would be appreciated that the example 470 may be equally applicable to other communication scenarios where a network device and a terminal device communicate with each other.

In the example 470, the terminal device 120 is configured with an SPS configuration #1. A HARQ timing value K1 for the SPS configuration #1 is indicated as 2. The network device 110 transmits SPS PDSCH in slots n and n+2. A PUCCH resource in a slot n+3 is a PUCCH resource determined by the terminal device 120 for postponed HARQ-ACK only. A PUCCH resource in a slot n+4 is a PUCCH resource indicated for the terminal device 120 by network device 110.

Based on the HARQ timing value K1 for the SPS configuration #1, the terminal device 120 determines that a HARQ feedback for the SPS PDSCH in a slot n is to be transmitted in a slot n+2. However, based on a TDD configuration (not shown), the terminal device 120 determines that the slot n+2 is configured for downlink transmission. Thus, the terminal device 120 determines that the slot n+2 is unavailable for transmission of the HARQ feedback for the SPS PDSCH in the slot n. In this case, the terminal device 120 postpones the transmission of the HARQ feedback.

The terminal device 120 determines an uplink slot n+3 based on a TDD configuration. In turn, the terminal device 120 selects a PUCCH resource from the uplink slot n+3 based on n1PUCCH-AN or a starting entry in SPS-PUCCH-AN-List. Then, the terminal device 120 transmits the postponed HARQ feedback on the selected PUCCH resource in the slot n+3.

In the example 470, as long as there is an available PUCCH resource, the terminal device 120 may select the PUCCH resource for transmission of the postponed HARQ feedback. Thus, delay for transmission of the postponed HARQ feedback is reduced.

Table 5 shows pseudo codes for the example 470.

TABLE 5

The first SPS PDSCH indicated by active DCI is received on slot n1, k1 is HARQ timing indicated in DCI or configured by RRC.
When SPS PDSCH is received on slot n
   if slot n+k1 is DL slot or flexible symbols not available for PUCCH transmission,
      find the minimum integer m > 0 such that slot n+k1+m is UL slot;
      if no PUCCH resource is indicated on slot n+k1+m   //else ➔ fall back to any of examples 410-460
         the terminal device 120 determines a PUCCH resource provided by n1PUCCH-AN or 1st entry in SPS-PUCCH-AN-List in UL slot n+k1+m;
         k1'= k1+m;
         set the HARQ timing for SPS PDSCH on slot n to k1';
      end if
      transmit delayed HARQ-ACK for SPS PDSCH on slot n in PUCCH on slot n+k1'
   end if In some example embodiments, in order to transmit the postponed HARQ feedback for SPS PDSCH, the terminal device 120 may determine the second resource based on a HARQ timing value for the first SPS downlink transmission and a parameter P. The parameter P indicates a resource spacing and being predefined or configured by the network device. This will be described with reference to FIG. 4I.

Figure 4I:
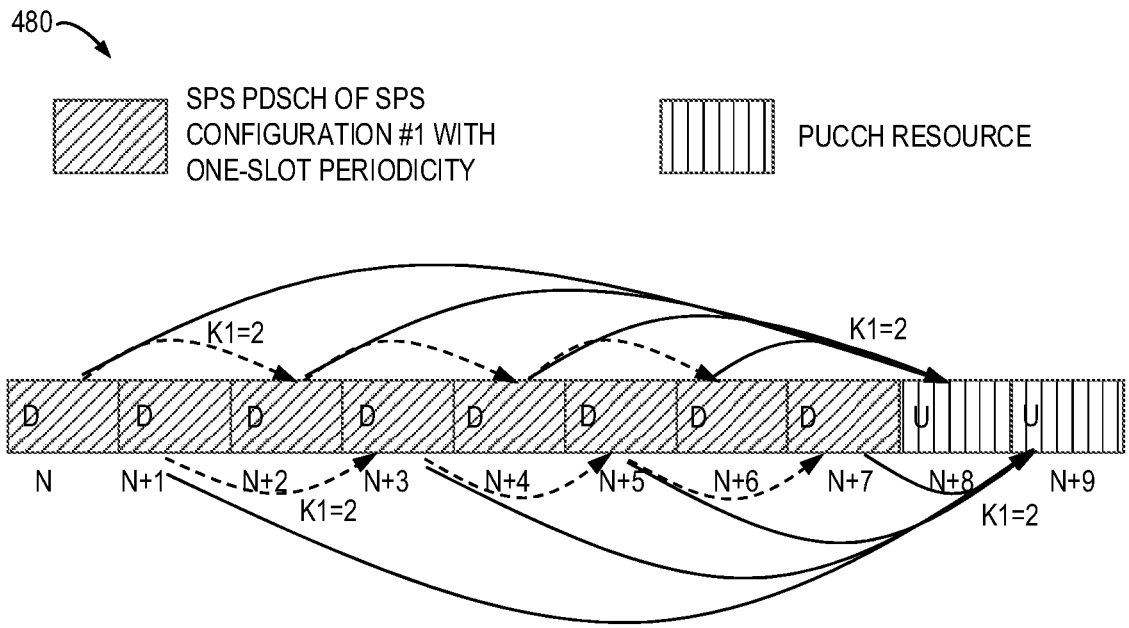

FIG. 4I illustrates an example 480 in which the postponed HARQ feedback is transmitted on the resource determined based on a HARQ timing value and a parameter p in accordance with some embodiments of the present disclosure. For the purpose of discussion, the example 480 will be described with reference to FIG. 2. However, it would be appreciated that the example 480 may be equally applicable to other communication scenarios where a network device and a terminal device communicate with each other.

In the example 480, the terminal device 120 is configured with an SPS configuration #1 with one-slot periodicity. A HARQ timing value K1 for the SPS configuration #1 is indicated as 2. The network device 110 transmits SPS PDSCH in slots n to n+7. The parameter P is configured as 2.

Based on the HARQ timing value K1 for the SPS configuration #1, the terminal device 120 determines that a HARQ feedback for the SPS PDSCH in a slot n is to be transmitted in a slot n+2. However, based on a TDD configuration (not shown), the terminal device 120 determines that the slot n+2 is configured for downlink transmission. Thus, the terminal device 120 determines that the slot n+2 is unavailable for transmission of the HARQ feedback for the SPS PDSCH in the slot n. In this case, the terminal device 120 postpones the transmission of the HARQ feedback.

The terminal device 120 determines an earliest available PUCCH resource in a slot n+k1+mxP indicated for HARQ feedback for the SPS PDSCH in a slot n+mxP, where m is a positive integer. In a PUCCH resource in the slot n+k1+mxP, the terminal device 120 may transmit the postponed HARQ feedback for the SPS PDSCH in the slot n.

In the example 480, the postponed HARQ feedbacks for the SPS PDSCHs in slots n, n+2, n+4 are transmitted in the PUCCH resource in the slot n+8, and the postponed HARQ feedbacks for the SPS PDSCHs in the slots n+1, n+3, n+5 are transmitted in the PUCCH resource in the slot n+9. Thus, the postponed HARQ feedbacks are distributed in two slots, avoiding overload in a single slot.

Table 6 shows pseudo codes for the example 480.

TABLE 6

The first SPS PDSCH indicated by active DCI is received on slot n1, k1 is HARQ timing indicated in DCI or configured by RRC. P is indicated in DCI or configured by RRC.
While SPS PDSCH is received in slot n
    Find the minimum integer m >= 0 such that slot n+k1+m × P has PUCCH resource for HARQ-ACK feedback
    if m > 0 AND PUCCH resource for HARQ-ACK for SPS PDSCH in slot n+m × P not collides with DL symbol/flexible symbol; // first available PUCCH resource
        k1'= k1+m × P;
        set the HARQ timing for SPS PDSCH in slot n to k1';
    end if
    Transmit postponed HARQ-ACK for SPS PDSCH in slot n in PUCCH resource in slot n+k1'
End while In some example embodiments, in order to transmit the postponed HARQ feedback for SPS PDSCH, the terminal device 120 may determine the second resource based on a HARQ timing value and a threshold number of HARQ feedbacks to be transmitted on the second resource. The threshold number may be predefined or configured by the network device 110. This will be described with reference to FIG. 4J.

Figure 4J:
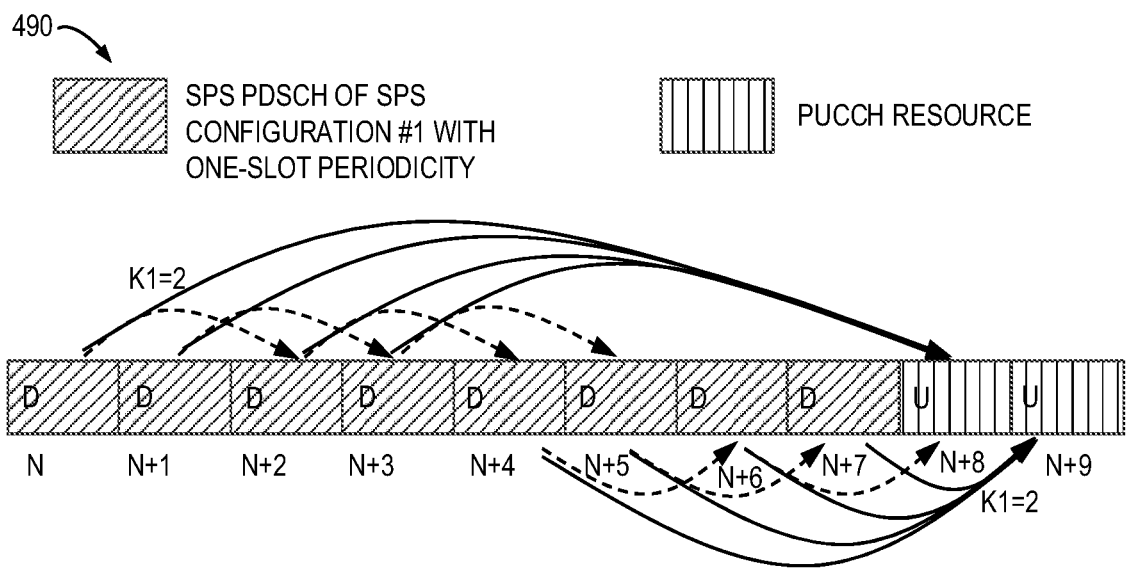

FIG. 4J illustrates an example 490 in which the postponed HARQ feedback is transmitted on the resource determined based on a HARQ timing value and a threshold number of HARQ feedbacks in accordance with some embodiments of the present disclosure. For the purpose of discussion, the example 490 will be described with reference to FIG. 2. However, it would be appreciated that the example 490 may be equally applicable to other communication scenarios where a network device and a terminal device communicate with each other.

In the example 490, the terminal device 120 is configured with an SPS configuration #1 with one-slot periodicity. A HARQ timing value K1 for the SPS configuration #1 is indicated as 2. The network device 110 transmits SPS PDSCH in slots n to n+7. The threshold number N_max of HARQ feedbacks is configured as 4.

In the example 490, the postponed HARQ feedbacks for the SPS PDSCHs in slots n, n+1, n+2, n+3 are transmitted in the PUCCH resource in the slot n+8, and the postponed HARQ feedbacks for the SPS PDSCHs in the slots n+4, n+5, n+6, n+7 are transmitted in the PUCCH resource in the slot n+9. Thus, the postponed HARQ feedbacks are distributed in two slots, avoiding overload in a single slot.

Table 7 shows pseudo codes for the example 490.

TABLE 7

Figure 5:
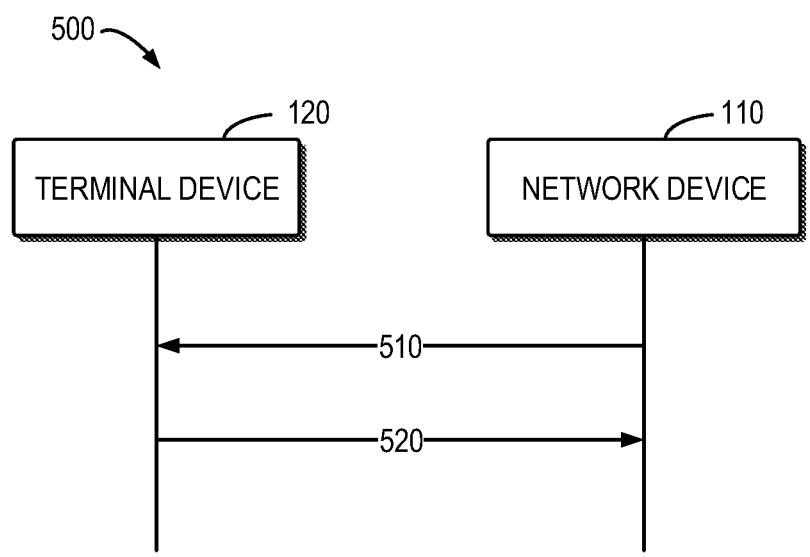
FIG. 5 illustrates an example signaling chart showing an example process for transmitting HARQ feedback in accordance with some embodiments of the present disclosure.

The first SPS PDSCH indicated by active DCI is received on slot n1, k1 is HARQ timing indicated in DCI or configured by RRC. N_max is indicated in DCI or configured by RRC.
Set m1 = n1, m2 = 0.
While SPS PDSCH is received on slot n
    Find the minimum m >= MAX(n+k1, m1) such that slot m has PUCCH resource for HARQ-ACK feedback
      if m > m1
        m1 = m;
        m2 = 0;
      end if
    m2 = m2 + 1;
    if N_max is configured AND m2 == N_max // non-configured N_max falls back to example 410 or 440
      m1 = m1 + 1; // invalid PUCCH slot m
      m2 = 0;
    end if
    k1' = m − n, and set the HARQ timing for SPS PDSCH in slot n to k1'.
End while FIG. 5 illustrates an example signaling chart showing an example process 500 for transmitting HARQ feedback in accordance with some embodiments of the present disclosure. For the purpose of discussion, the communication process 500 will be described with reference to FIG. 2. However, it would be appreciated that the communication process 500 may be equally applicable to other communication scenarios where a network device and a terminal device communicate with each other.

As shown in FIG. 5, if the network device 110 fails to receive from the terminal device 120 a group of HARQ feedbacks for SPS downlink transmissions, the network device 110 transmits (510) to the terminal device 120 a request for the group of HARQ feedbacks. The request information is carried in DCI format 1_1 or DCI format 1_2 with CRC scrambled by CS-RNTI or C-RNTI. Accordingly, the terminal device 120 receives the request from the network device 110. Upon receiving the request, the terminal device 120 transmits (520) to the network device 110 a HARQ-ACK codebook that comprises the group of HARQ feedbacks. Hereinafter, the HARQ-ACK codebook is also referred to as a Type-3 HARQ-ACK codebook.

In accordance with some embodiments of the present disclosure, the network device 110 provides the terminal device 120 with more transmission opportunities for the postponed HARQ-ACK for SPS PDSCH to avoid the HARQ-ACK dropping. Thus, the unnecessary SPS PDSCH retransmission is reduced, the spectrum efficiency is improved.

In some example embodiments, the SPS downlink transmissions comprise a first group of SPS downlink transmissions and a second group of SPS downlink transmissions. HARQ feedbacks for the first group of SPS downlink transmissions have a first priority, and HARQ feedbacks for the second group of SPS downlink transmissions have a second priority different from the first priority.

Figure 6:
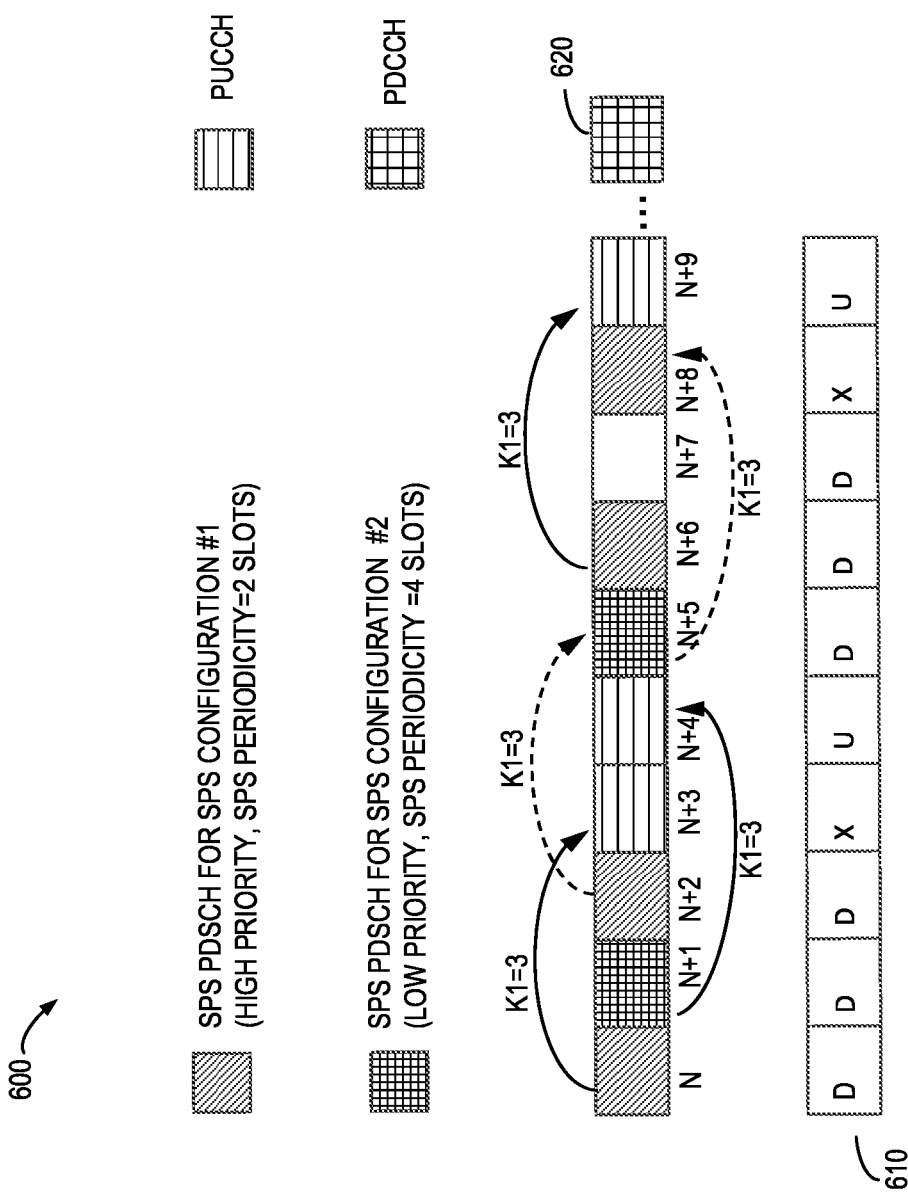
FIG. 6 illustrates a simplified block diagram of an example process for transmitting HARQ feedback in accordance with some embodiments of the present disclosure.

Consider an example as illustrated in FIG. 6. FIG. 6 illustrates an example 600 in which the requested Type-3 HARQ-ACK codebook comprises HARQ feedbacks for SPS PDSCHs having different priorities in accordance with some embodiments of the present disclosure. For the purpose of discussion, the example 600 will be described with reference to FIG. 2. However, it would be appreciated that the example 600 may be equally applicable to other communication scenarios where a network device and a terminal device communicate with each other.

In the example 600, the terminal device 120 is configured with an SPS configuration #1 and an SPS configuration #2. A HARQ timing value K1 for the SPS configuration #1 is indicated as 3. A HARQ timing value K1 for the SPS configuration #2 is indicated as 3. The network device 110 transmits SPS PDSCH in slots n, n+2, n+6 and n+8 for the SPS configuration #1 and SPS PDSCH in a slots n+1 and n+5 for the SPS configuration #2. PUCCH resources in slots n+3, n+4 and n+9 are configured for transmission of HARQ feedbacks for SPS downlink transmission. HARQ feedbacks for SPS PDSCHs in the slots n, n+2, n+6 and n+8 have a high priority. HARQ feedbacks for SPS PDSCHs in the slots n+1 and n+5 have a low priority.

Based on the HARQ timing value K1 for the SPS configuration #1, the terminal device 120 determines that a HARQ feedback for the SPS PDSCH in the slot n+2 is to be transmitted in the slot n+5. However, based on a TDD configuration 610, the terminal device 120 determines that the slot n+5 is configured for downlink transmission. Thus, the terminal device 120 determines that the slot n+5 is unavailable for transmission of the HARQ feedback for the SPS PDSCH in the slot n+2. Similarly, the terminal device 120 determines that the slot n+8 is unavailable for transmission of the HARQ feedback for the SPS PDSCH in the slot n+5. In this case, the terminal device 120 postpones the transmission of the HARQ feedbacks for the SPS PDSCHs in the slots n+2 and n+5.

In a slot 620, the network device 110 transmits to the terminal device 120 a request for the postponed HARQ feedbacks. Upon receiving the request, the terminal device 120 transmits to the network device 110 a HARQ-ACK codebook that comprises the postponed HARQ feedbacks.

In some example embodiments, the request may indicate the priority of HARQ feedbacks for the SPS PDSCHs. In this case, the terminal device 120 transmits to the network device 110 a Type-3 HARQ-ACK codebook that comprises at least part of HARQ feedbacks having the indicated priority.

Figure 7A:
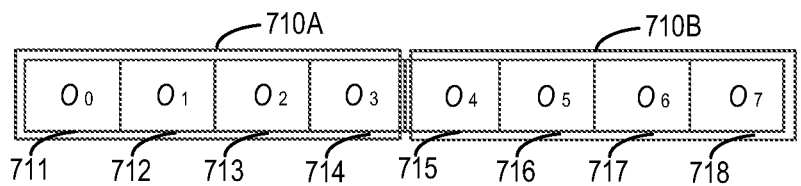
FIGS. 7A-7C illustrate simplified block diagrams of HARQ-ACK codebooks in accordance with some embodiments of the present disclosure, respectively.

Consider an example as illustrated in FIG. 7A. FIG. 7A illustrates an example 710 in which the Type-3 HARQ-ACK codebook comprises at least part of HARQ feedbacks for the SPS PDSCHs having the indicated priority in accordance with some embodiments of the present disclosure. For the purpose of discussion, the example 710 will be described with reference to FIG. 2. However, it would be appreciated that the example 710 may be equally applicable to other communication scenarios where a network device and a terminal device communicate with each other.

In the example 710, configuration for the terminal device 120 is shown in Table 8.

TABLE 8

| Configuration Number of Configured CC | |
|---|---|
| CC #0 | CC #1 |
| SPS configuration #1 (low priority) | SPS configurations #2 and #3 (high priority) |
| SPS configuration #1: number of HARQ processes = 6, HARQ process ID set{0, 1, 2, 3, 4, 5} | SPS configuration #2: number of HARQ processes = 4, HARQ process ID set{0, 1, 2, 3} SPS configuration #3: number of HARQ processes = 4, HARQ process ID set{0, 1, 2, 3} |

In the example 710, the request from the network device 110 indicates the high priority of HARQ feedbacks for the SPS PDSCHs in CC #1. In this case, the Type-3 HARQ-ACK codebook comprises a first group of HARQ feedbacks 710A for the SPS PDSCHs for the SPS configuration #2 having the high priority, and a second group of HARQ feedbacks 710B for the SPS PDSCHs for the SPS configuration #3 having the high priority. In the first group of HARQ feedbacks 710A, HARQ feedbacks 711 to 714 represent HARQ feedbacks for SPS PDSCHs with the HARQ process ID set {0,1,2,3} for the SPS configuration #2. In the second group of HARQ feedbacks 710B, HARQ feedbacks 715 to 718 represent HARQ feedbacks for SPS PDSCHs with the HARQ process ID set {0,1,2,3} for the SPS configuration #3.

In such example embodiments, a size of the Type-3 HARQ-ACK codebook may be determined based on the number of one or more activated, configured or indicated SPS configurations associated with the indicated priority in a CC. The size of the Type-3 HARQ-ACK codebook may be also determined based on the number of DL HARQ processes configured for the one or more configured, activated or indicated SPS configurations. In this case, an index of the SPS configuration may be indicated by reusing HARQ Process Number (HPN) field in the request. In addition, the size of the Type-3 HARQ-ACK codebook may be also determined based on the number of serving CCs for the activated, configured or indicated SPS configurations.

In such example embodiments, in the Type-3 HARQ-ACK codebook, the HARQ feedbacks may be arranged in an ascending order of HARQ process ID per {SPS configuration index, serving cell index}, and then in an ascending order of SPS configuration index per {serving cell index}, and then in an ascending order of serving cell index.

In some example embodiments, the first group of SPS downlink transmissions comprises a first subgroup of SPS downlink transmissions associated with a first set of HARQ processes and a second subgroup of SPS downlink transmissions associated with a second set of HARQ processes. In such some example embodiments, the terminal device 120 may determine a union of the first set of HARQ processes and the second set of HARQ processes. In turn, the terminal device 120 may generate the HARQ-ACK codebook that comprises HARQ feedbacks for SPS downlink transmissions associated with the union. In other words, the HARQ-ACK codebook comprises the total number of non-overlapped DL HARQ process ID for activated, configured or indicated SPS configurations associated with the indicated priority in serving CC(s). Thus, a size of the HARQ-ACK codebook may be reduced.

In such example embodiments, if more than one SPS configuration is activated in a cell, the total number of non-overlapped HARQ process IDs for multiple SPS configurations is used to determine the size of the HARQ-ACK codebook.

For example, if the number of HARQ processes for SPS configuration #1=8, HARQ process ID set={0,1,2,3,4,5,6, 7}, the number of HARQ processes for SPS configuration #2=4, HARQ process ID set={8,9,10,11}, then the total number of non-overlapped HARQ process IDs for the SPS configurations #1 and #2 is 12.

For another example, if the number of HARQ processes for SPS configuration #1=8, HARQ process ID set={0,1,2, 3,4,5,6,7}, the number of HARQ processes for SPS configuration #2=4, HARQ process ID set={0,1,2,3}, then the total number of non-overlapped HARQ process IDs for the SPS configurations #1 and #2 is 8.

In such example embodiments, in the HARQ-ACK codebook, HARQ feedbacks may be arranged in an ascending order of HARQ process ID per serving cell index, and then in an ascending order of serving cell index.

Figure 7B:
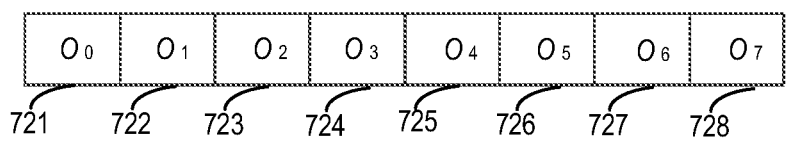

Consider an example as illustrated in FIG. 7B. FIG. 7B illustrates an example 720 in which the Type-3 HARQ-ACK codebook comprises HARQ feedbacks for SPS downlink transmissions associated with the union in accordance with some embodiments of the present disclosure. For the purpose of discussion, the example 720 will be described with reference to FIG. 2. However, it would be appreciated that the example 720 may be equally applicable to other communication scenarios where a network device and a terminal device communicate with each other.

In the example 720, configuration for the terminal device 120 is shown in Table 9.

TABLE 9

| Configuration Number of Configured CC | |
|---|---|
| CC #0 | CC #1 |
| SPS configuration #1 (low priority) SPS configuration #1: number of HARQ processes = 6, HARQ process ID set{0, 1, 2, 3, 4, 5} | SPS configurations #2 and #3 (high priority) SPS configuration #2: number of HARQ processes = 4, HARQ process ID set{0, 1, 2, 3} SPS configuration #3: number of HARQ processes = 8, HARQ process ID set{0, 1, 2, 3, 4, 5, 6, 7} |

In the example 720, the request from the network device 110 indicates the high priority of HARQ feedbacks for the SPS PDSCHs in CC #1. In this case, a union of HARQ process ID set {10,1,2,3} and HARQ process ID set {0, 1, 2, 3, 4, 5, 6, 7} is {0, 1, 2, 3, 4, 5, 6, 7}. Thus, the Type-3 HARQ-ACK codebook comprises HARQ feedbacks 721 to 728 for the SPS PDSCHs associated with the union {0, 1, 2, 3, 4, 5, 6, 7}.

In some example embodiments, the first group of SPS downlink transmissions is associated with a third set of HARQ processes, and the second group of SPS downlink transmissions is associated with a fourth set of HARQ processes without overlapping with the third set of HARQ processes. In such example embodiments, the configured DL HARQ processes for SPS configurations may be divided into two sets, and each set is associated with one priority. The HARQ-ACK codebook comprises the set of DL HARQ processes in serving CC(s) for activated, configured or indicated SPS configurations associated with the indicated priority. In this way, redundancy may be further reduced.

For example, HARQ process ID set={0,2,4,6} is configured for SPS configurations associated with a low priority, HARQ process ID set={1,3,5,7} is configured for SPS configurations associated with a high priority. Two CCs are configured, wherein CC #0 is for SPS configuration with low and high priorities, and CC #1 is for SPS configuration with the low priority. If HARQ feedbacks having the high priority is requested, the HARQ-ACK codebook comprises four HARQ feedbacks for SPS PDSCHs with HARQ process ID set={1,3,5,7} in CC #0.

Figure 7C:
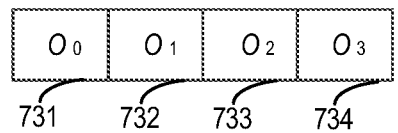

Consider an example as illustrated in FIG. 7C. FIG. 7C illustrates an example 730 in which the configured DL HARQ processes for SPS configurations are divided into two sets in accordance with some embodiments of the present disclosure. For the purpose of discussion, the example 730 will be described with reference to FIG. 2. However, it would be appreciated that the example 730 may be equally applicable to other communication scenarios where a network device and a terminal device communicate with each other.

In the example 730, configuration for the terminal device 120 is shown in Table 10.

TABLE 10

| Configuration Number of Configured CC | |
|---|---|
| CC #0 | CC #1 |
| SPS configuration #1 (low priority) SPS configuration #2 (high priority) number of HARQ processes = 4 HARQ process ID set = {0, 2, 4, 6} for SPS configuration #1 HARQ process ID set = {1, 3, 5, 7} for SPS configuration #2. | SPS configurations #3 (low priority) number of HARQ processes = 4, |

In the example 730, the request from the network device 110 indicates the high priority of HARQ feedbacks for the SPS PDSCHs. In this case, the Type-3 HARQ-ACK codebook comprises HARQ feedbacks 731 to 734 for the SPS PDSCHs associated with the HARQ process ID set={1,3,5, 7}.

In some example embodiments, the requested Type-3 HARQ-ACK codebook may comprise HARQ feedbacks for SPS PDSCHs with mixed priorities.

In some example embodiments, a size of the Type-3 HARQ-ACK codebook may be determined based on the number of one or more activated, configured or indicated SPS configurations in a CC. The size of the Type-3 HARQ-ACK codebook may also be determined based on the number of DL HARQ processes configured for the configured, activated or indicated SPS configuration. In this case, the SPS configuration index may be indicated by reusing HPN field in the request. The size of the Type-3 HARQ-ACK codebook may also be determined based on the number of serving CCs for the one or more activated, configured or indicated SPS configurations.

In such example embodiments, the Type-3 HARQ-ACK codebook may comprise the total number of DL HARQ processes for the one or more activated, configured or indicated SPS configurations in the serving CC(s). Alternatively, the Type-3 HARQ-ACK codebook may comprise the total number of non-overlapped DL HARQ process ID for the one or more activated, configured or indicated SPS configurations in the serving CC(s).

In some example embodiments, the terminal device 120 may determine a resource for transmission of the group of HARQ feedbacks based on parameters associated with one of a plurality of priorities. Thus, clear mapping relation for PUCCH related parameters associated with one priority and Type-3 HARQ-ACK codebook with mixed priority may need to be defined. In turn, the terminal device 120 may transmit the HARQ-ACK codebook on the determined resource.

In some example embodiments, the parameters may comprise at least one of the following: PUCCH resource sets, K1 set, code rate, or power control parameters.

In some example embodiments, the parameters associated with high priority or low priority for the Type-3 HARQ-ACK codebook containing HARQ feedbacks for SPS PDSCHs with mixed priorities may be determined by a predefined configuration. For example, the predefined configuration may define always using parameters related to high priority.

In some example embodiments, the parameters associated with high priority or low priority for the Type-3 HARQ-ACK codebook containing HARQ feedbacks for SPS PDSCH with mixed priorities may be determined by RRC configuration.

In some example embodiments, the parameters associated with high priority or low priority for the Type-3 HARQ-ACK codebook containing HARQ feedbacks for SPS PDSCH with mixed priorities may be determined by DCI indication. For example, the priority indicator field in the requested DCI maybe reused.

In some example embodiments, there are provided different PUCCH resource determination mechanisms for HARQ-ACK for (DG PDSCH and/or SPS PDSCH) and SPS PDSCH only without PDCCH.

In a first example, for the Type-3 HARQ-ACK codebook for SPS PDSCH only but with requested PDCCH, the terminal device 120 may select one of sets of resources configured for DG PDSCH based on a payload of the group of HARQ feedbacks and select the resource from the selected set based on the indicator of the resource.

In a second example, for the Type-3 HARQ-ACK codebook for SPS PDSCH only but with requested PDCCH, the terminal device 120 may select, from a set of resources configured for SPS downlink transmission, a resource for transmission of the group of HARQ feedbacks based on a payload of the group of HARQ feedbacks.

In a third example, for the Type-3 HARQ-ACK codebook for SPS PDSCH only but with requested PDCCH, the terminal device 120 may receive information concerning a resource configured for transmission of the group of HARQ feedbacks and determine a resource based on the information.

In some example embodiments, which one of the first, second and third examples may be used depending on RRC configuration from the network device 110. In this way, clear behavior of the terminal device 120 for PUCCH resource determination for the requested Type-3 HARQ-ACK codebook for SPS PDSCHs may be defined.

In some example embodiments, for intra-UE collision scenario, the PUCCH resource including the postponed HARQ feedbacks is always regarded as a high priority.

Figure 8:
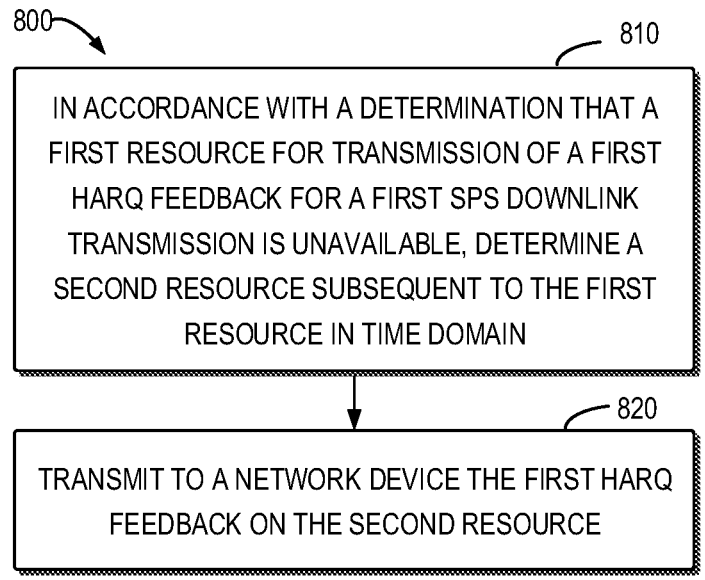
FIG. 8 illustrates a flowchart of an example method in accordance with some embodiments of the present disclosure.

FIG. 8 illustrates a flowchart of an example method 800 in accordance with some embodiments of the present disclosure. In some embodiments, the method 800 can be implemented at a terminal device, such as the terminal device 120 as shown in FIG. 2. Additionally or alternatively, the method 800 can also be implemented at the terminal device 130 as shown in FIG. 2 or other terminal devices not shown in FIG. 2. For the purpose of discussion, the method 800 will be described with reference to FIG. 2 as performed by the terminal device 120 without loss of generality.

At block 810, if the terminal device 120 determines that a first resource for transmission of a first HARQ feedback for a first SPS downlink transmission is unavailable, the terminal device 120 determines a second resource subsequent to the first resource in time domain. At block 820, the terminal device 120 transmits to the network device 110 the first HARQ feedback on the second resource.

In some example embodiments, the second resource may be the earliest available resource among resources configured for transmission of a second HARQ feedback for a second SPS downlink transmission different from the first SPS downlink transmission.

Additionally, in some example embodiments, if it is determined that a third resource for transmission of a third HARQ feedback for a third SPS downlink transmission is unavailable, the terminal device 120 generates a first HARQ-ACK codebook by multiplexing the first HARQ feedback and the third HARQ feedback with the second HARQ feedback. The third resource is prior to the second resource in time domain. In turn, the terminal device 120 may transmit the first HARQ-ACK codebook on the second resource.

In some example embodiments, the terminal device 120 may bundle the first HARQ feedback and the third HARQ feedback as one bit and generate the first HARQ-ACK codebook by multiplexing the one bit with the second HARQ feedback.

In some example embodiments, the first HARQ feedback and the second HARQ feedback have a first priority, and the third HARQ feedback has a second priority higher than the first priority.

In some example embodiments, the terminal device 120 may bundle the first HARQ feedback and the second HARQ feedback as one bit and generate the first HARQ-ACK codebook by multiplexing the one bit with the third HARQ feedback.

In some example embodiments, the terminal device 120 may generate the first HARQ-ACK codebook that comprises a first sub-codebook and a second sub-codebook.

The first sub-codebook comprises the first HARQ feedback and the second HARQ feedback with the first priority, and the second sub-codebook comprises the third HARQ feedback with the second priority.

In some example embodiments, the first HARQ-ACK codebook comprises the first, second and third HARQ feedbacks, and the first, second and third HARQ feedbacks are arranged in the first HARQ-ACK codebook in an order of indexes of downlink slots in which the first, second and third SPS downlink transmissions are received.

Alternatively or additionally, in some example embodiments, the first, second and third HARQ feedbacks may be arranged in the first HARQ-ACK codebook in an order of indexes of SPS configurations for the first, second and third SPS downlink transmissions.

Alternatively or additionally, in some example embodiments, the first, second and third HARQ feedbacks may be arranged in the first HARQ-ACK codebook in an order of indexes of component carriers configured for the first, second and third SPS downlink transmissions.

In some example embodiments, the second resource may be the earliest resource among resources indicated for transmission of a HARQ feedback for a dynamic downlink transmission and configured for transmission of a HARQ feedback for a SPS downlink transmission.

Additionally, in some example embodiments, the terminal device 120 may generate a second HARQ-ACK codebook by multiplexing the first HARQ feedback with the HARQ feedback for the dynamic downlink transmission. In turn, the terminal device 120 may transmit the first HARQ feedback in the second HARQ-ACK codebook.

In some example embodiments, the terminal device 120 may determine a position in the second HARQ-ACK codebook based on a set of HARQ timing values for the dynamic downlink transmission. In turn, the terminal device 120 may arrange the first HARQ feedback in the determined position.

In some example embodiments, if it is determined that a fourth resource for transmission of a fourth HARQ feedback for a fourth SPS downlink transmission is unavailable, the terminal device 120 may generate the second HARQ-ACK codebook by multiplexing the first HARQ feedback and the fourth HARQ feedback with the dynamic HARQ feedback. The fourth resource is prior to the second resource in time domain.

In some example embodiments, the terminal device 120 may bundle the first HARQ feedback and the fourth HARQ feedback as one bit. In turn, the terminal device 120 may generate the second HARQ-ACK codebook by appending the one bit to the HARQ feedback for the dynamic downlink transmission.

In some example embodiments, the terminal device 120 may generate the second HARQ-ACK codebook by appending a third sub-codebook to a fourth sub-codebook. The third sub-codebook comprises the first HARQ feedback and the fourth HARQ feedback, and the fourth sub-codebook comprises the HARQ feedback for the dynamic downlink transmission.

Additionally, in some example embodiments, the terminal device 120 may determine an uplink slot based on a time division duplexing configuration. In turn, the terminal device 120 may select a PUCCH resource as the second resource transmitted in the uplink slot based on an identifier of the PUCCH resource. Alternatively or additionally, the terminal device 120 may select a PUCCH resource as the second resource from the uplink slot based on a starting entry in a list of PUCCH resources for downlink SPS HARQ acknowledge.

Additionally, in some example embodiments, the terminal device 120 may determine the second resource based on a HARQ timing value for the first SPS downlink transmission and a parameter. The parameter indicates a resource spacing and is predefined, dynamically indicated or configured by the network device.

Additionally, in some example embodiments, the terminal device 120 may determine the second resource based on a HARQ timing for the first SPS downlink transmission and a threshold number of HARQ feedbacks to be transmitted on the second resource.

Figure 9:
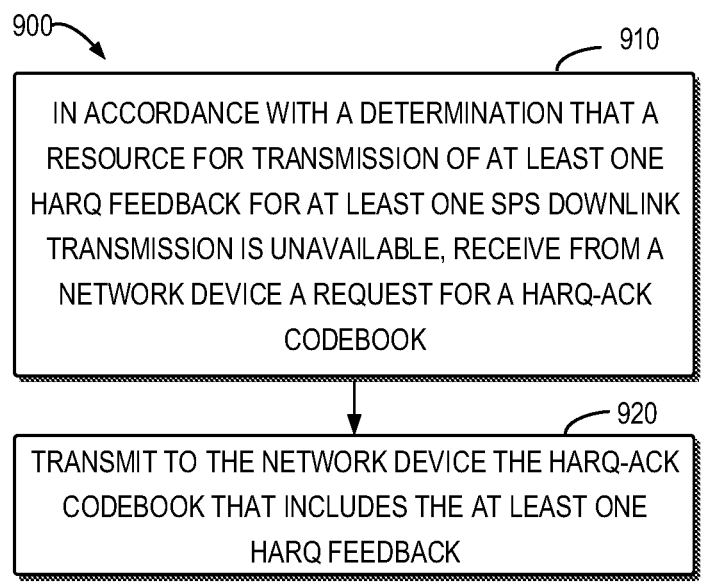
FIG. 9 illustrates a flowchart of another example method in accordance with some embodiments of the present disclosure.

FIG. 9 illustrates a flowchart of an example method 900 in accordance with some embodiments of the present disclosure. In some embodiments, the method 900 can be implemented at a terminal device, such as the terminal device 120 as shown in FIG. 2. Additionally or alternatively, the method 900 can also be implemented at the terminal device 130 as shown in FIG. 2 or other terminal devices not shown in FIG. 2. For the purpose of discussion, the method 900 will be described with reference to FIG. 2 as performed by the terminal device 120 without loss of generality.

At block 910, if it is determined that a resource for transmission of at least one Hybrid Automatic Repeat Request, HARQ, feedback for at least one Semi-persistent Scheduling, SPS, downlink transmission is unavailable, the terminal device 120 receives from the network device 110 a request for a HARQ-ACK codebook. At block 910, the terminal device 120 transmits to the network device 110 the HARQ-ACK codebook that comprises the at least one HARQ feedback.

In some example embodiments, the at least one HARQ feedback comprises a first plurality of HARQ feedbacks that have a single priority, and the request indicates the single priority.

In some example embodiments, the HARQ-ACK codebook is determined based on at least one of the following: the number of at least one SPS configuration having the single priority, the at least one SPS configuration being configured, activated or indicated, the number of HARQ processes of the at least one SPS configuration, or the number of serving component carriers for the at least one SPS configuration.

In some example embodiments, the at least one SPS configuration comprises a plurality of SPS configurations associated with a plurality of sets of HARQ processes in a serving cell. In such example embodiments, the terminal device 120 may generate the HARQ-ACK codebook by determining a union of the plurality of sets of HARQ processes; and generating the HARQ-ACK codebook that comprises HARQ feedbacks for SPS downlink transmissions associated with the union.

In some example embodiments, the at least one SPS downlink transmission comprises a third group of SPS downlink transmissions associated with a third set of HARQ processes and a fourth group of SPS downlink transmissions associated with a fourth set of HARQ processes without overlapping with the third set of HARQ processes. In such example embodiments, a first groups of HARQ feedbacks for the third group of SPS downlink transmissions has a third priority, and a second groups of HARQ feedbacks for the fourth group of SPS downlink transmissions has a third priority different from the first priority. In such example embodiments, the HARQ-ACK codebook comprises one of the first and second groups of HARQ feedbacks.

In some example embodiments, the at least one HARQ feedback comprises a second plurality of HARQ feedbacks that have different priorities.

Additionally, in some example embodiments, the terminal device 120 may determine a resource for transmission of the second plurality of HARQ feedbacks based on parameters associated with one of the priorities and transmit the HARQ-ACK codebook on the determined resource.

In some example embodiments, association between the parameters and the one of the priorities is preconfigured, or configured by a first radio resource control message from the network device, or indicated by the request.

In some example embodiments, the request comprises an indicator of a resource for transmission of the HARQ-ACK codebook. In some example embodiments, the terminal device 120 may select one of sets of resources configured for dynamic scheduling downlink transmission based on a payload of the second plurality of HARQ feedbacks and select the resource from the selected set based on the indicator of the resource. In turn, the terminal device 120 may transmit the HARQ-ACK codebook in the selected resource.

Additionally, in some example embodiments, the terminal device 120 may select, from a set of resources configured for SPS downlink transmission, a resource for transmission of the HARQ-ACK codebook based on a payload of the second plurality of HARQ feedbacks. In turn, the terminal device 120 may transmit the HARQ-ACK codebook in the selected resource.

Additionally, in some example embodiments, the terminal device 120 may receive from the network device a second radio resource control message, the second radio resource control message comprising information concerning a resource for transmission of the second plurality of HARQ feedbacks. Further, the terminal device 120 may determine a resource based on the information and transmit the HARQ-ACK codebook on the determined resource.

Figure 10:
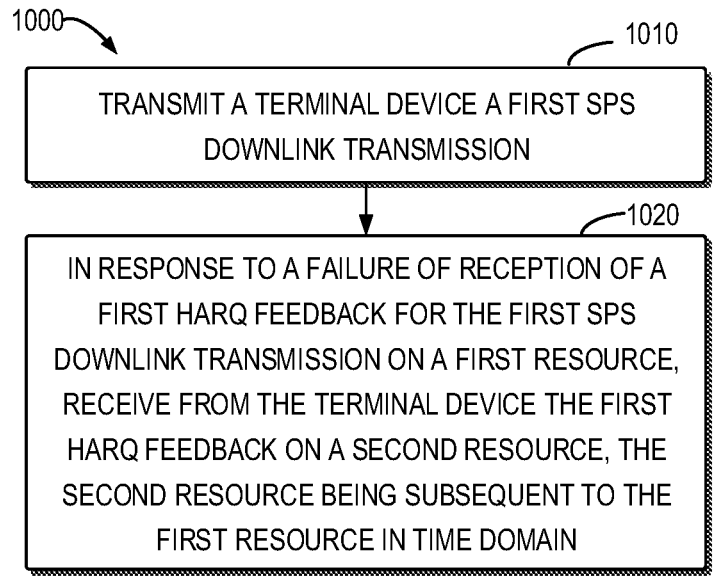
FIG. 10 illustrates a flowchart of yet another example method in accordance with some embodiments of the present disclosure.

FIG. 10 illustrates a flowchart of an example method 1000 in accordance with some embodiments of the present disclosure. In some embodiments, the method 1000 can be implemented at a network device, such as the network device 110 as shown in FIG. 2. Additionally or alternatively, the method 1000 can also be implemented at other network devices not shown in FIG. 2. For the purpose of discussion, the method 1000 will be described with reference to FIG. 2 as performed by the network device 110 without loss of generality.

At block 1010, the network device 110 transmits to a terminal device a first SPS downlink transmission. At block 1020, if the network device 110 fails to receive a first HARQ feedback for the first SPS downlink transmission on a first resource, the network device 110 receives from the terminal device the first HARQ feedback on a second resource. The second resource is subsequent to the first resource in time domain.

In some example embodiments, the second resource is the earliest available resource among resources configured for transmission of a second HARQ feedback for a second SPS downlink transmission different from the first SPS downlink transmission.

In some example embodiments, if the network device 110 fails to receive a third HARQ feedback for a third SPS downlink transmission on a third resource, the network device 110 receives a first HARQ Acknowledge, HARQ-ACK, codebook in the second resource. The first HARQ-ACK codebook is generated by multiplexing the first HARQ feedback and the third HARQ feedback with the second HARQ feedback. The third resource is prior to the second resource in time domain.

In some example embodiments, the first HARQ feedback and the third HARQ feedback are bundled as one bit; and the first HARQ-ACK codebook is generated by multiplexing the one bit with the second HARQ feedback.

In some example embodiments, the first HARQ feedback and the second HARQ feedback have a first priority, and the third HARQ feedback has a second priority higher than the first priority.

In some example embodiments, the first HARQ feedback and the second HARQ feedback are bundled as one bit, and the first HARQ-ACK codebook is generated by multiplexing the one bit with the third HARQ feedback.

In some example embodiments, the first HARQ-ACK codebook comprises a first sub-codebook and a second sub-codebook. The first sub-codebook comprises the first HARQ feedback and the second HARQ feedback with the first priority, and the second sub-codebook comprises the third HARQ feedback with the second priority.

In some example embodiments, the first HARQ-ACK codebook comprises the first, second and third HARQ feedbacks. The first, second and third HARQ feedbacks are arranged in the first HARQ-ACK codebook in an order of at least one of the following: indexes of downlink slots in which the first, second and third SPS downlink transmissions are received, indexes of SPS configurations for the first, second and third SPS downlink transmissions, or indexes of component carriers configured for the first, second and third SPS downlink transmissions.

In some example embodiments, the second resource is the earliest resource among resources indicated for transmission of a HARQ feedback for a dynamic downlink transmission and configured for transmission of a HARQ feedback for a SPS downlink transmission.

In some example embodiments, the network device 110 receives the first HARQ feedback in a second HARQ-ACK codebook. The second HARQ-ACK codebook is generated by multiplexing the first HARQ feedback with the HARQ feedback for the dynamic downlink transmission.

In some example embodiments, a position is determined in the second HARQ-ACK codebook based on a set of HARQ timing values for the dynamic downlink transmission, and the first HARQ feedback is included in the determined position.

In some example embodiments, if the network device 110 fails to receive a fourth HARQ feedback for a fourth SPS downlink transmission on a fourth resource, the network device 110 receives the second HARQ-ACK codebook that is generated by multiplexing the first HARQ feedback and the fourth HARQ feedback with the dynamic HARQ feedback. The fourth resource is prior to the second resource in time domain.

In some example embodiments, the first HARQ feedback and the fourth HARQ feedback are bundled as one bit, and the second HARQ-ACK codebook is generated by appending the one bit to the dynamic HARQ feedback.

In some example embodiments, the second HARQ-ACK codebook is generated by appending a third sub-codebook to a fourth sub-codebook. The third sub-codebook comprises the first HARQ feedback and the fourth HARQ feedback, and the fourth sub-codebook comprises the HARQ feedback for the dynamic downlink transmission.

n some example embodiments, an uplink slot is determined based on a time division duplexing configuration, and a Physical Uplink Control Channel, PUCCH, resource is selected as the second resource transmitted in the uplink slot based on one of the following: an identifier of the PUCCH resource, or a starting entry in a list of PUCCH resources for downlink SPS HARQ acknowledge.

In some example embodiments, the second resource is determined based on a HARQ timing value for the first SPS downlink transmission and a parameter. The parameter indicates a resource spacing and is predefined, dynamic indicated or configured by the network device.

In some example embodiments, the second resource is determined based on a HARQ timing for the first SPS downlink transmission and a threshold number of HARQ feedbacks to be transmitted on the second resource.

Figure 11:
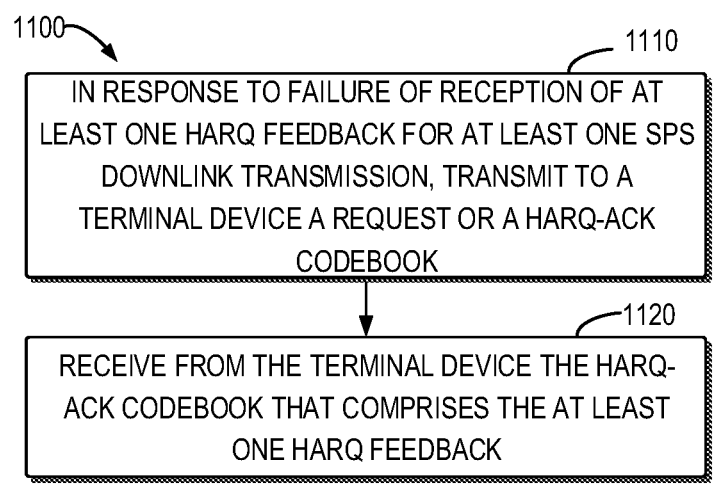
FIG. 11 illustrates a flowchart of still another example method in accordance with some embodiments of the present disclosure.

FIG. 11 illustrates a flowchart of an example method 1100 in accordance with some embodiments of the present disclosure. In some embodiments, the method 1100 can be implemented at a network device, such as the network device 110 as shown in FIG. 2. Additionally or alternatively, the method 1100 can also be implemented at other network devices not shown in FIG. 2. For the purpose of discussion, the method 1100 will be described with reference to FIG. 2 as performed by the network device 110 without loss of generality.

At block 1110, if the network device 110 fails to receive at least one Hybrid Automatic Repeat Request, HARQ, feedback for at least one Semi-persistent Scheduling, SPS, downlink transmission, the network device 110 transmits to the terminal device 110 a request or a HARQ Acknowledge, HARQ-ACK, codebook. At block 1120, the network device 110 receives from the terminal device 120 the HARQ-ACK codebook that comprises the at least one HARQ feedbacks.

In some example embodiments, the at least one HARQ feedback comprises a first plurality of HARQ feedbacks that have a single priority, and the request indicates the single priority.

In some example embodiments, the HARQ-ACK codebook is determined based on at least one of the following: the number of at least one SPS configuration having the single priority, the at least one SPS configuration being configured, activated or indicated, the number of HARQ processes of the at least one SPS configuration, or the number of serving component carriers for the at least one SPS configuration.

In some example embodiments, the at least one SPS configuration comprises a plurality of SPS configurations associated with a plurality of sets of HARQ processes in a serving cell. In such example embodiments, the HARQ-ACK codebook comprises HARQ feedbacks for SPS downlink transmissions associated with a union a union of the plurality of sets of HARQ processes.

In some example embodiments, the at least one SPS downlink transmission comprises a third group of SPS downlink transmissions associated with a third set of HARQ processes and a fourth group of SPS downlink transmissions associated with a fourth set of HARQ processes without overlapping with the third set of HARQ processes. In such example embodiments, a first groups of HARQ feedbacks for the third group of SPS downlink transmissions has a third priority, and a second groups of HARQ feedbacks for the fourth group of SPS downlink transmissions has a third priority different from the first priority. In such example embodiments, the HARQ-ACK codebook comprises one of the first and second groups of HARQ feedbacks.

In some example embodiments, the at least one HARQ feedback comprises a second plurality of HARQ feedbacks that have different priorities.

In some example embodiments, the network device 110 receives the HARQ-ACK codebook on a resource for transmission of the second plurality of HARQ feedbacks. The resource is determined based on parameters associated with one of the priorities.

In some example embodiments, association between the parameters and the one of the priorities is preconfigured, or configured by a first radio resource control message from the network device, or indicated by the request.

In some example embodiments, the request comprises an indicator of a resource for transmission of the HARQ-ACK codebook. In such example embodiments, the network device 110 receives the HARQ-ACK codebook on a resource, the resource being selected from one of sets of resources configured for dynamic scheduling downlink transmission based on a payload of the second plurality of HARQ feedbacks.

In some example embodiments, the network device 110 receives the HARQ-ACK codebook on a resource for transmission of the HARQ-ACK codebook, the resource being selected from a set of resources configured for SPS downlink transmission based on a payload of the second plurality of HARQ feedbacks.

In some example embodiments, the network device 110 transmits to the terminal device a second radio resource control message, the second radio resource control message comprising information concerning a resource configured for transmission of the second plurality of HARQ feedbacks. In such example embodiments, the network device 110 receives the HARQ-ACK codebook on a resource that is determined based on the information.

Figure 12:
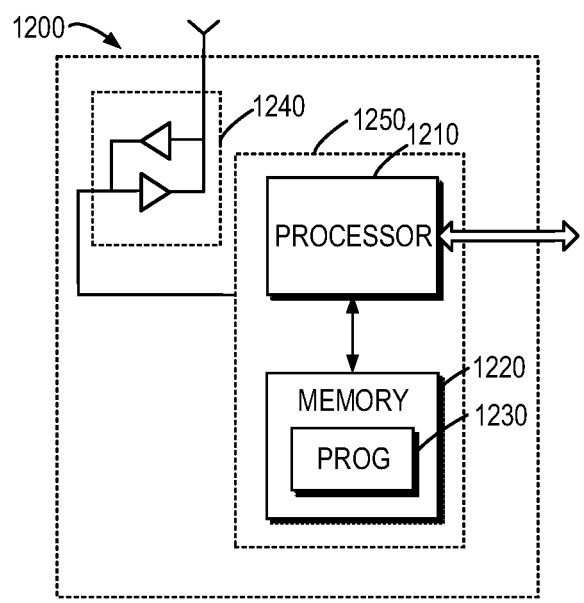
FIG. 12 is a simplified block diagram of a device that is suitable for implementing some embodiments of the present disclosure.

FIG. 12 is a simplified block diagram of a device 1200 that is suitable for implementing some embodiments of the present disclosure. The device 1200 can be considered as a further example embodiment of the network device 110, the terminal device 120, or the terminal device 130 as shown in FIG. 2. Accordingly, the device 1200 can be implemented at or as at least a part of the network device 110, the terminal device 120, or the terminal device 130.

As shown, the device 1200 includes a processor 1210, a memory 1220 coupled to the processor 1210, a suitable transmitter (TX) and receiver (RX) 1240 coupled to the processor 1210, and a communication interface coupled to the TX/RX 1240. The memory 1220 stores at least a part of a program 1230. The TX/RX 1240 is for bidirectional communications. The TX/RX 1240 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 1230 is assumed to include program instructions that, when executed by the associated processor 1210, enable the device 1200 to operate in accordance with the embodiments of the present disclosure, as discussed herein with reference to FIGS. 3 to 11. The embodiments herein may be implemented by computer software executable by the processor 1210 of the device 1200, or by hardware, or by a combination of software and hardware. The processor 1210 may be configured to implement various embodiments of the present disclosure. Furthermore, a combination of the processor 1210 and memory 1220 may form processing means 1250 adapted to implement various embodiments of the present disclosure.

The memory 1220 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1220 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 3 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of a User Equipment (UE), the method comprising:
   multiplexing, in a Physical Uplink Control Channel (PUCCH), first Hybrid Automatic Repeat Request-Acknowledge (HARQ-ACK) information for Semi-persistent Scheduling (SPS) Physical downlink shared channel (PDSCH) receptions and second HARQ-ACK information in a PUCCH transmission that is triggered by first Downlink Control Information (DCI), wherein the second HARQ-ACK information has a same priority value as the first HARQ-ACK information;
   transmitting the PUCCH; and
   deferring the first HARQ-ACK information, in a case where the first HARQ-ACK information drops due to Time Division Duplexing (TDD) communication,
   wherein the multiplexing is a multiplexing of the first HARQ-ACK information that is deferred, and the second HARQ-ACK information that has the same priority value as the first HARQ-ACK information, and
   wherein the UE determines a PUCCH resource based on SPS-PUCCH-AN-List for the multiplexed the first HARQ-ACK information that is deferred due to TDD communication, and the second HARQ-ACK information with the same priority as the first HARQ-ACK information.

2. A User Equipment (UE), comprising:
   a memory storing instructions; and
   a processor configured to execute the instructions to:
      multiplex, in a Physical Uplink Control Channel (PUCCH), first Hybrid Automatic Repeat Request-Acknowledge (HARQ-ACK) information for Semi-persistent Scheduling (SPS) Physical downlink shared channel (PDSCH) receptions and second HARQ-ACK information in a PUCCH transmission that is triggered by first Downlink Control Information (DCI), wherein the second HARQ-ACK information has a same priority value as the first HARQ-ACK information;
transmit the PUCCH; and
defer the first HARQ-ACK information, in a case where the first HARQ-ACK information drops due to Time Division Duplexing (TDD) communication,
wherein the multiplexing is a multiplexing of the first HARQ-ACK information that is deferred, and the second HARQ-ACK information that has the same priority value as the first HARQ-ACK information, and
wherein the UE determines a PUCCH resource based on SPS-PUCCH-AN-List for the multiplexed the first HARQ-ACK information that is deferred due to TDD communication, and the second HARQ-ACK information with the same priority as the first HARQ-ACK information.

* * * * *